(12) United States Patent
Silfen et al.

(10) Patent No.: US 11,891,148 B2
(45) Date of Patent: Feb. 6, 2024

(54) CONFIGURABLE BICYCLE-MOUNTABLE CARRIER ASSEMBLY

(71) Applicant: MedTech Analytics, LLC, Nantucket, MA (US)

(72) Inventors: Eric Silfen, Nantucket, MA (US); Matt Garfield, Philadelphia, PA (US); Matthew Bell, Media, PA (US); Christopher Kolb, Philadelphia, PA (US)

(73) Assignee: MEDTECH ANALYTICS, LLC, Nantucket, MA (US)

( * ) Notice: Subject to any disclaimer, the term of this patent is extended or adjusted under 35 U.S.C. 154(b) by 0 days.

(21) Appl. No.: 17/139,412

(22) Filed: Dec. 31, 2020

(65) Prior Publication Data

US 2021/0197912 A1     Jul. 1, 2021

Related U.S. Application Data

(60) Provisional application No. 62/955,794, filed on Dec. 31, 2019.

(51) Int. Cl.
   *B62J 11/00* (2020.01)
   *B62J 9/26* (2020.01)
   (Continued)

(52) U.S. Cl.
   CPC . *B62J 9/26* (2020.02); *B62J 9/27* (2020.02); *B62J 9/30* (2020.02); *B62J 11/04* (2020.02)

(58) Field of Classification Search
   CPC ....... B62J 9/27; B62J 9/30; B62J 11/04; B62J 9/26; B62J 9/003; B62J 11/05;
   (Continued)

(56) References Cited

U.S. PATENT DOCUMENTS

| 1,571,376 A | * | 2/1926 | Rogers | B60C 25/142 |
| | | | | 254/50.1 |
| 4,535,923 A | * | 8/1985 | Manke | B60N 3/103 |
| | | | | 224/272 |

(Continued)

OTHER PUBLICATIONS

All Rite Products Store Amazon Webpage, "All Rite Products Bike Spinning Rod Holder—Carries a Fishing Pole on a Bicycle or an ATV—Model CR1," retrieved from the Internet on Jun. 2, 2021, retrieved from <<https://www.amazon.com/All-Rite-Release-Single-Holder/dp/B001AWJUTE>>.

(Continued)

*Primary Examiner* — Nathan J Newhouse
*Assistant Examiner* — Matthew T. Theis
(74) *Attorney, Agent, or Firm* — FisherBroyles, LLP

(57) ABSTRACT

A bicycle-mountable carrier assembly includes a mounting assembly attachable to a rail of the bicycle's saddle. At least one payload support is joined, e.g., pivotably, to the mounting assembly. The payload support defines a structure for mounting at least one payload carrier attachment in a secure but removable fashion. One or more payload supports may be provided, and one or more mounting structures may be provided on each payload support. The mounting structures may be provided in a rear-and side-facing positions and in different angular orientations, for carrying of payloads in a variety of different positions and orientations. The carrier further includes at least one payload carrier attachment defining a mounting structure complementary to the payload support's mounting structure. The payload carrier may be adapted to function as a fishing rod holder, a fishing rod case holder, a water bottle, a fishing tackle box, or another payload as desired.

39 Claims, 18 Drawing Sheets

(51) Int. Cl.
*B62J 9/27* (2020.01)
*B62J 9/30* (2020.01)
*B62J 11/04* (2020.01)

(58) Field of Classification Search
CPC ..... B62J 9/006; B62J 7/04; B62J 11/00; B62J 9/20; B62J 1/28; B62J 6/00; B62J 1/007; A01K 97/10; Y10S 224/922; Y10T 29/53683; B25B 5/166; B25B 5/085; B25B 5/068
USPC .............. 224/427, 412, 448, 449, 453, 922; D12/114
See application file for complete search history.

(56) References Cited

U.S. PATENT DOCUMENTS

| | | | | |
|---|---|---|---|---|
| 4,957,227 | A * | 9/1990 | Trimble | B62J 11/04 224/462 |
| 5,052,146 | A * | 10/1991 | Resnick | A01K 97/10 43/21.2 |
| 5,086,958 | A * | 2/1992 | Nagy | B60N 3/002 224/277 |
| 6,401,998 | B1 * | 6/2002 | Puluso | B62J 7/00 224/413 |
| 6,637,707 | B1 * | 10/2003 | Gates | A47F 5/08 248/222.12 |
| 8,393,111 | B1 * | 3/2013 | Johnson | A01K 97/08 43/21.2 |
| 8,640,999 | B2 * | 2/2014 | Chen | B62J 1/08 297/215.14 |
| 9,079,626 | B2 * | 7/2015 | Zuraski | E05B 71/00 |
| 2003/0029209 | A1 * | 2/2003 | Kuo | E05B 71/00 70/233 |
| 2009/0084019 | A1 * | 4/2009 | Carnevali | F16M 11/2078 43/21.2 |
| 2010/0264184 | A1 * | 10/2010 | Retief | B62J 11/00 224/427 |

OTHER PUBLICATIONS

Altieri, "Violin/Viola Shaped/Triangle Case, Deluxe #77," retrieved from the Internet on Jun. 2, 2021, retrieved from <<https://altieribags.com/products/deluxe-violin-viola-shaped-triangle-case-77>>.
Beach Fishing Carts, "Fish N Mate Bicycle Fishing Rod Holder," Retrieved from the Internet on Jun. 2, 2021, retrieved from <<https://beachfishingcarts.com/products/bicycle-fishing-rod-holder>>.
Bike Balance, "Bike Surf Rack," Jan. 19, 2019, retrieved from the Internet Archive on Jun. 2, 2021, retrieved from <<https://web.archive.org/web/20190119150449/http://bikebalance.com/Details_Attachment_Surfboard.html>>.
Bike Fisherman, "Fishing Rod Holders for Bicycles," Retrieved from the Internet Archive, Sep. 4, 2019, Retrieved on Jun. 2, 2021, Retrieved from <<https://web.archive.org/web/20190904101720/http://www.bikefisherman.com/index.ydev>>.
Blackburn, "Outpost Cargo Cage," retrieved from the Internet on Jun. 2, 2021, retrieved from <<https://www.blackburndesign.com/p/outpost-cargo-bike-cage/>>.
Blackburn, "Outpost Seat Pack & Dry Bag," retrieved from the Internet on Jun. 2, 2021, retrieved from <<https://www.blackburndesign.com/p/outpost-bike-seat-pack-dry-bag/#pid=7099765>>.
BW Sports Store Amazon Webpage, "BW Sports Spinning Rod & Reel Case for (7 ft) 2-Piece Spinning or Baitcasting Rods with Large Guides, Dual RC-3072, Single, RC-3070," retrieved from the Internet on Jun. 2, 2021, retrieved from <<https://www.amazon.com/dp/B00DSDMJJG/ref=cm_sw_su_dp>>.
DOM Store Amazon Webpage, "DOM Gorilla Cage—Huge Bike Water Bottle Cage for Bike Packing, Adventure Cycling & Cycle Touring," retrieved on Jun. 2, 2021, retrieved from <<https://www.amazon.com/Dom-Gorilla-Cage-Packing-Adventure/dp/B01HD79VHU?th=1>>.

EasyGoProducts Store Amazon Webpage, "EasyGoProducts EGP-SURF-004-1 EasyGo Surfboard Rack-Surf Holder—Bike Board Carrier-Guaranteed Best Value-Fits 27.2mm and Larger Seat Posts," retrieved from the Internet on Jun. 2, 2021, retrieved from <<https://www.amazon.com/EasyGoProducts-EGP-SURF-004-1-EasyGo-Surfboard-Rack-Surf/dp/B07HR42KK4/ref=sr_1_1?keywords=B07HR42KK4&qid=1563835525&s=gateway&sr=8-1>>.
Hitorhike Store Amazon Webpage, "Hitorhike Fishing Rod Holder Universal Fit Kit Allows for 360-degree Adjustment Kayak Fishing Boat Powerlock Rod Holder," Retrieved from the Internet on Jun. 2, 2021, Retrieved from <<https://www.amazon.com/Hitorhike-Fishing-Universal-360-degree-Adjustment/dp/B07FQ1H63P/ref=sr_1_1?keywords=B07FQ1H63P&qid=1563816790&s=sporting-goods&sr=1-1>>.
Hyde, Quill, "Guitar Bike Rack," Dec. 27, 2010, YouTube Video, retrieved from YouTube on Jun. 2, 2021, retrieved from <<https://www.youtube.com/watch?v=aLpeNy52Xg8>>.
In the Hole Golf, "The Golf Bike," retrieved from the Internet on Jun. 2, 2021, retrieved from <<https://www.intheholegolf.com/GOLF-BIKE/The-Golf-Bike.html>>.
McKechnie, Beth, DIY: Panniers (or how to carry a guitar by bike), May 31, 2014, Green Action Centre, retrieved on Jun. 2, 2021, retrieved from <<https://greenactioncentre.ca/green-your-routine/diy-panniers-or-how-to-carry-a-guitar-by-bike/>>.
OTW Staff, "A Guide to Canal Bikes," Jun. 24, 2013, pp. 1-5.
RAM Mounts, "RAM Light-Speed Fishing Rod Holder with Rail Base," Retrieved from the Internet on Jun. 2, 2021, Retrieved from <<https://www.rammount.com/part/RAP-370-R>>.
Rambo Electric Bikes, "Rambo Gun/Bow Holder," retrieved from the Internet on Jun. 2, 2021, retrieved from<<https://www.rambobikes.com/electric-bike/r170-rambo-gunbow-holder/>>.
Red Rock Outdoor Gear Store Amazon Webpage, "Red Rock Outdoor Gear Deluxe Rifle Backpack," retrieved from the Internet on Jun. 2, 2021, retrieved from <<https://www.amazon.com/Red-Rock-Outdoor-Gear-Backpack/dp/B00J9NW9X0>>.
Robert Beckman Designs—RP Pannier Models, "ATS Hummingbird RP Pannier Models," Dec. 23, 2019, retrieved from Internet Archive on Jun. 2, 2021, retrieved from <<https://web.archive.org/web/20200126151942/http://robertbeckmandesigns.net:80/rpmodels.php>>.
Rockbros Store Amazon Webpage, "Rockbros Bikepacking Bag Waterproof Large Capacity Bikepacking Seat Bag Road Mountain Bike Seat Bag Bike Saddle Bag Max 14L, 10L," retrieved from the Internet on Jun. 2, 2021, retrieved from <<https://www.amazon.com/ROCKBROS-Bikepacking-Waterproof-Capacity-Mountain/dp/B092HN2QC2>>.
Rod-Runner, "Rod Holder & Mount: White," Retrieved from the Internet on Jun. 2, 2021, retrieved from <<https://rod-runner.com/shop/uni-mount-with-rod-holder-white/>>.
Roswheel Store Amazon Webpage, "Roswell 141364 Fully Waterproof Bike Panniers 20L Capacity Bicycle Rack Bag," retrieved from the Internet on Jun. 2, 2021, retrieved from <<https://www.amazon.com/Roswheel-141364-Waterproof-Panniers-Capacity/dp/B074THLVRN/ref=sr_1_1?keywords=B074THLVRN&qid=1563835886&s=sporting-goods&sr=1-1>>.
Scotty, "Power Lock," Retrieved from the Internet on Jun. 2, 2021, retrieved from <<http://scotty.com/product-category/fishing-gear-equipment/powerlock/>>.
Scotty, "Rail Mounts," Retrieved from the Internet on Jun. 2, 2021, retrieved from <<http://scotty.com/product-category/fishing-gear-equipment/rod-holder-mounts/rail-mounts/>>.
SP Ableware by Maddak, "Ableware 706631000 Fishing Pole Holder for Wheelchairs," retrieved from the Internet on Jun. 2, 2021, retrieved from <<https://www.wholesalepoint.com/product/Ableware-706631000.aspx>>.
Sunlite Amazon Webpage, "Sunlite Ramblin—Rod QR Beam Rack—JPA1106T," retrieved from the Internet on Jun. 2, 2021, retrieved from <<https://www.amazon.com/Sunlite-Ramblin-Beam-Rack-JPA1106T/dp/B07FD8LLLF/ref=sr_1_1?keywords=B07FD8LLLF&qid=1563816116&s=gateway&sr=8-1>>.

(56) References Cited

OTHER PUBLICATIONS

Muller DJ. Fishing the Cape Cod Canal—A Surfcaster's Guide to Stripers. 2017. Burford Books, Inc., Ithaca, NY. pp. 41-2.

* cited by examiner

CONFIGURABLE BICYCLE-MOUNTABLE CARRIER ASSEMBLY

CROSS-SECTION TO RELATED APPLICATION

This application claims the benefit of priority, under 35 U.S.C. 119(e), of U.S. provisional patent application no. 62/955,794 filed, Dec. 31, 2019, the entire disclosure of which is hereby incorporated herein by reference.

FIELD OF THE INVENTION

The present invention relates generally to the field of bicycle racks and carriers, and more particularly to a bicycle-mountable carrier assembly providing a high degree of adjustability and configurability for carrying a wide range of articles of different sizes and shapes in a variety of different spatial orientations.

DISCUSSION OF RELATED ART

Various general-purpose bicycle baskets and carriers are known in the art for transporting various articles. Many of these carriers are well-suite for accommodating relatively small items, such as a lunchbox/lunch bag/food items, articles of clothing, small packages, etc., most are not acceptable for transporting larger and/or elongated items such as fishing rods/rod cases, golf clubs/golf bags, baseball bats, tennis racquets, hockey sticks, etc.

To the extent that general-purpose bicycle baskets and/or carriers exist that might accept such larger/elongated items to be carried on the bicycle, they typically support such items in an unsecured manner, permit them to wobble or shift position drastically as the bicycle is ridden, and/or otherwise are inconveniently mounted such that there is a high likelihood of interference with operation of the bicycle and/or nearby bicyclists and pedestrians, and therefore are dangerous.

To the extent that some carriers exist for carrying such larger and/or elongated items, most of them are special-purpose or purpose-built, designed to be used with a specific article, such as a bag of golf clubs or a fishing rod. This makes them lack adjustability and/or configurability for use to carry a wide range of different articles.

A known alternative to such carriers for carrying larger and/or elongated items is to avoid the carrier entirely, keeping the transported article in or supported by one hand while steering with the other hand. This is both awkward and dangerous.

What is needed is a bicycle-mountable carrier assembly providing a high degree of adjustability and configurability for carrying a wide range of articles of different sizes and shapes, including larger and/or elongated items, in a variety of different spatial orientations, in a manner that is safe and does not interfere with the rider's operation of the bicycle.

SUMMARY

The present invention provides a bicycle-mountable carrier assembly providing a high degree of adjustability and configurability for carrying a wide range of articles of different sizes and shapes, including larger and/or elongated items, in a variety of different spatial orientations, in a manner that is safe and does not interfere with the rider's operation of the bicycle. More particularly, the present invention provides a carrier assembly mountable to rails of a saddle of a bicycle. The carrier assembly comprises a mounting assembly adapted for attachment to at least one rail of the saddle to secure the mounting assembly to the bicycle. This serves as a convenient point of attachment, so that the payload may be carrier without interfering with the rider or the operation of the bicycle.

The carrier further includes at least one payload support joined to the mounting assembly. The payload support defines a mounting structure (such as a keystone- or T-shaped boss) for mounting at least one payload carrier attachment in a secure but removable fashion, preferably in a friction-fit and/or gravity-based arrangement, so that the payload may be secured and removed in tool-free fashion. One or more payload supports may be provided, and one or more mounting structures may be provided on each payload support. By way of example, the mounting structures may be provided in a rear-facing position (e.g., for carrying payload over a rear bicycle tire) and/or a side-facing position (e.g., for carrying elongated payload alongside a rear bicycle tire). Additionally, the mounting structures may be provided in different angular orientations, such as in both horizontal and vertical positions, to further allow for carrying of payloads in a variety of different positions and orientations.

The carrier further includes at least one payload carrier attachment. Notably, the payload carrier attachment defines a mating mounting structure (such as a keystone or T-shaped channel) that is complementary to the mounting structure of the payload support. The payload carrier may be adapted in any suitable manner for carrying any suitable payload. By way of example, the payload carrier may be adapted to function as a fishing rod holder, a fishing rod case holder, a water bottle, a fishing tackle box, etc.

BRIEF DESCRIPTION OF THE FIGURES

An understanding of the following description will be facilitated by reference to the attached drawings, in which.

DETAILED DESCRIPTION

The present invention relates to bicycle racks and carriers, and provides a bicycle-mountable carrier assembly providing a high degree of adjustability and configurability for carrying a wide range of articles of different sizes and shapes, including larger and/or elongated items, in a variety of different spatial orientations, in a manner that is safe and does not interfere with the rider's operation of the bicycle. Exemplary embodiments of the present invention are discussed below for illustrative purposes.

Figure 1:
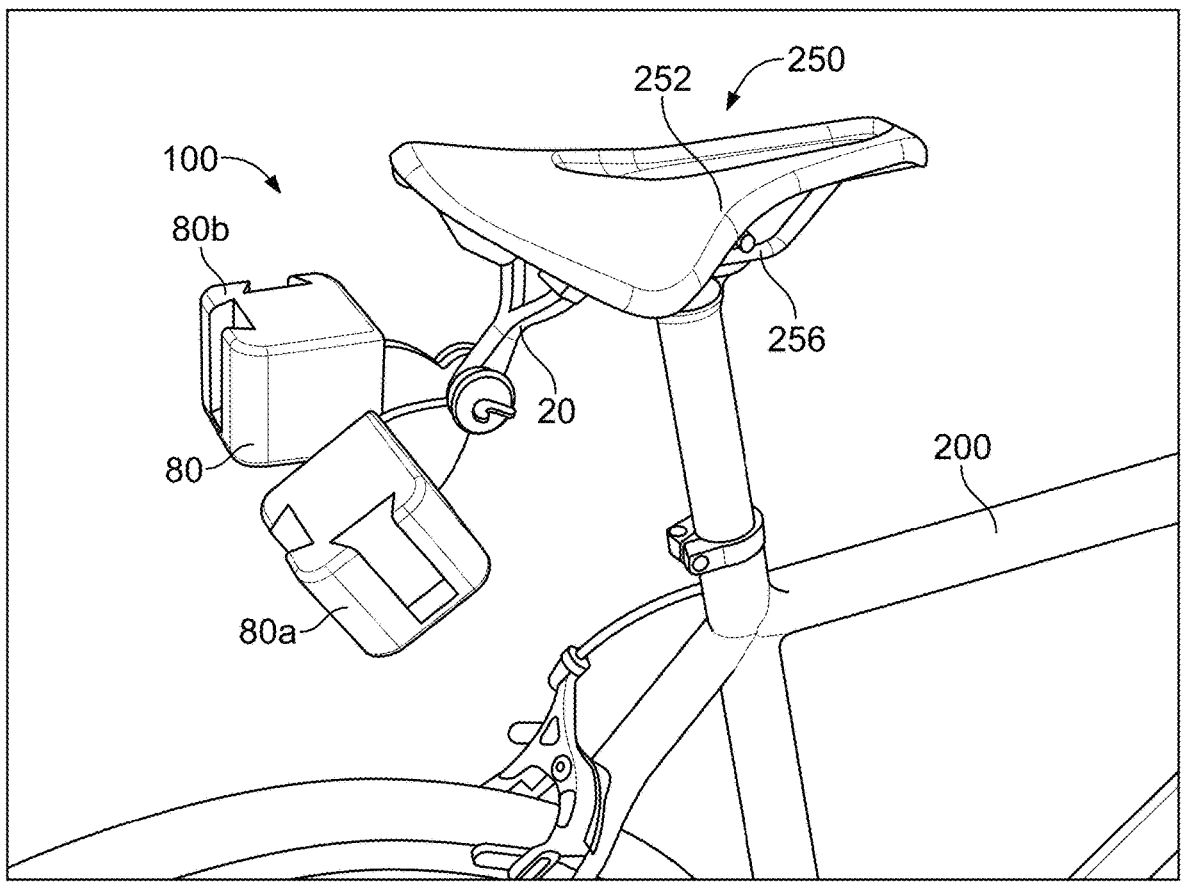
FIG. 1 is a perspective view of an exemplary bicycle-mountable carrier assembly shown attached to an exemplary saddle of an exemplary bicycle in accordance with an exemplary embodiment of the present invention.

FIG. 1 is a perspective view of an exemplary bicycle-mountable carrier assembly 100. The bicycle-mountable carrier assembly 100 includes a mounting assembly 20 and at least one payload support 80. The exemplary carrier assembly 100 of FIG. 2 includes two independent payload supports 80a, 80b.

The carrier assembly 100 of FIG. 1 is shown attached to an exemplary saddle 250 of an exemplary bicycle 200. Various bicycles and saddles are well-known in the art and beyond the scope of the present invention, and the present invention may be adapted for use with any bicycle and saddle. By way of example, a typical saddle 250 includes a hard shell often made from molded plastic and forming the overall shape of the saddle, a cover 252 providing padding on top of the hard shell, and rails 256 beneath the hard shell. The rails 256 of the saddle typically run along the length of the saddle, from nose to rear, and serve as the connection point to the rest of the bicycle. A typical configuration includes two spaced rails that engage a seat post or saddle clamp atop a seat post, which may be of various forms. Typical rails are round or oval, and have diameters or dimensions range from about 7 mm to about 10 mm, although other rail configurations exist.

Figure 2:
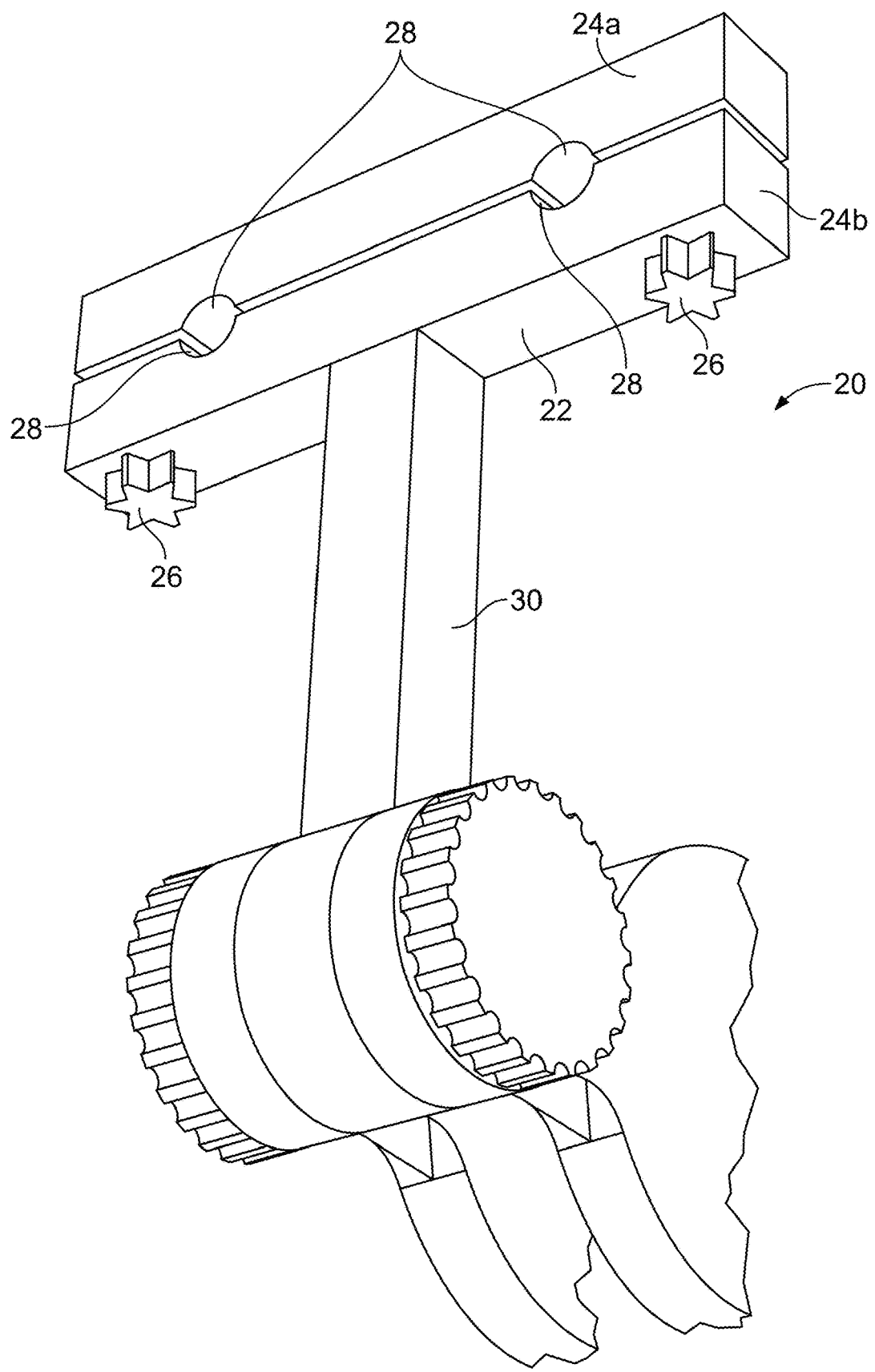
FIG. 2 is a perspective view of a mounting assembly of the bicycle-mountable carrier assembly of FIG. 1 in accordance with an exemplary embodiment of the present invention.
Figure 3:
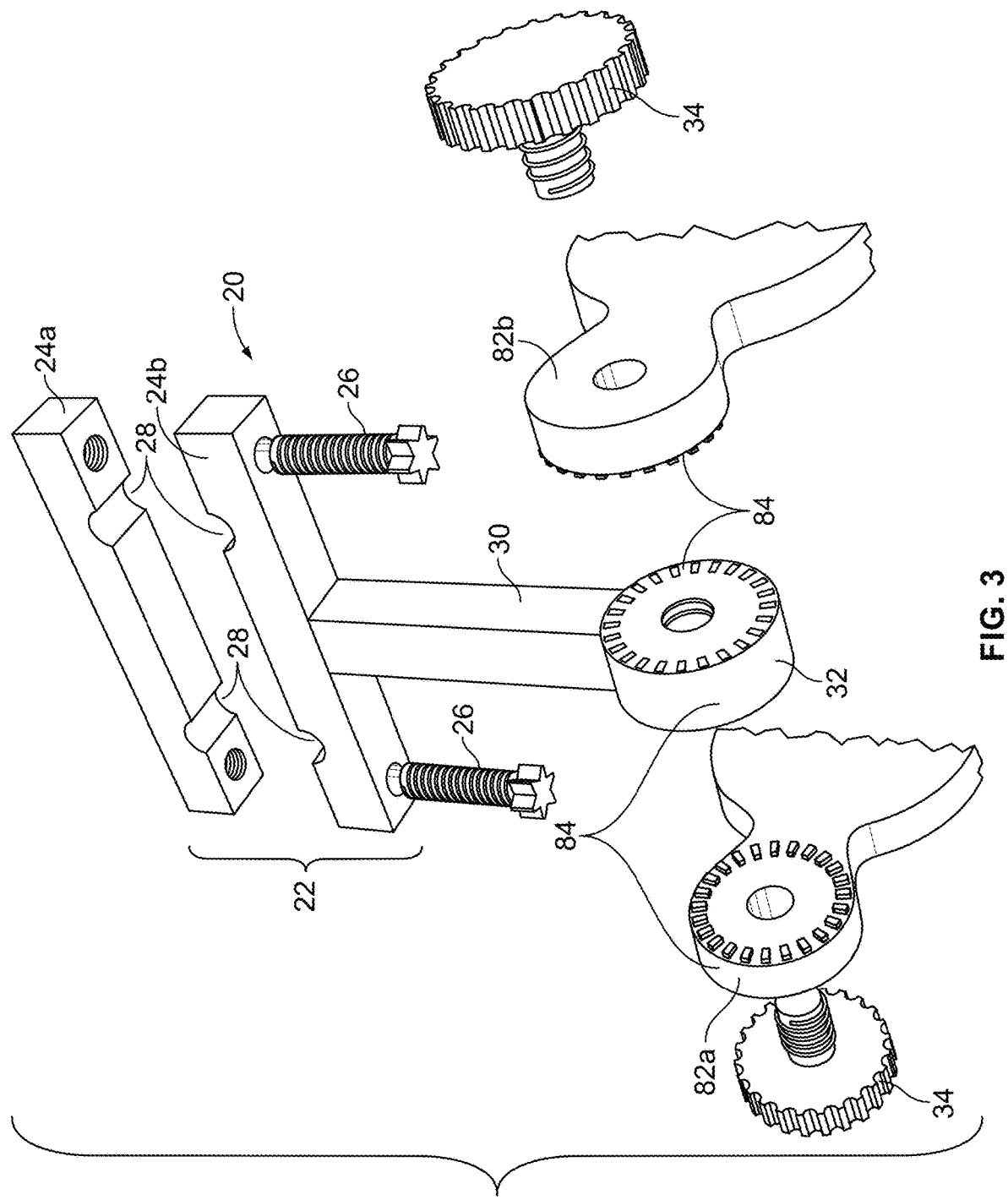
FIG. 3 is an exploded perspective view of the mounting assembly of FIG. 2.

The mounting assembly 20 is adapted for attachment of the carrier assembly 100 to the bicycle 200 using one or more of the rails 256 of the saddle 250. FIGS. 2 and 3 show in greater detail the mounting assembly 20 of the bicycle-mountable carrier assembly of FIG. 1. The exemplary mounting assembly 20 includes a clamp 22 including upper 24a and lower 24b jaws joined by adjustable fasteners, such as thumb screws 26. The jaws 24a, 24b are adjustable in position relative to one another by tightening and loosening the thumb screws 26. The exemplary jaws 24a, 24b both define relieved portions 28 positioned and dimensioned to receive the rails 256 of the saddle(s) for which carrier assembly is intended to be used. The thumb screws 26 are adjustable to clamp the rails 256 between the jaws to mount the mounting assembly to the rails 256, and thus to the bicycle 200.

One of the jaws, in this case the lower jaw 24b, is attached to a spreader 30 that is either joined to or attached/attachable to a payload support 80. The spreader 30 serves to spatially separate the payload support 80 from the rails/saddle, as may be desired for convenience and/or accessibility and/or to avoid interference of the carrier assembly components with other portions of the bicycle.

Figure 4:
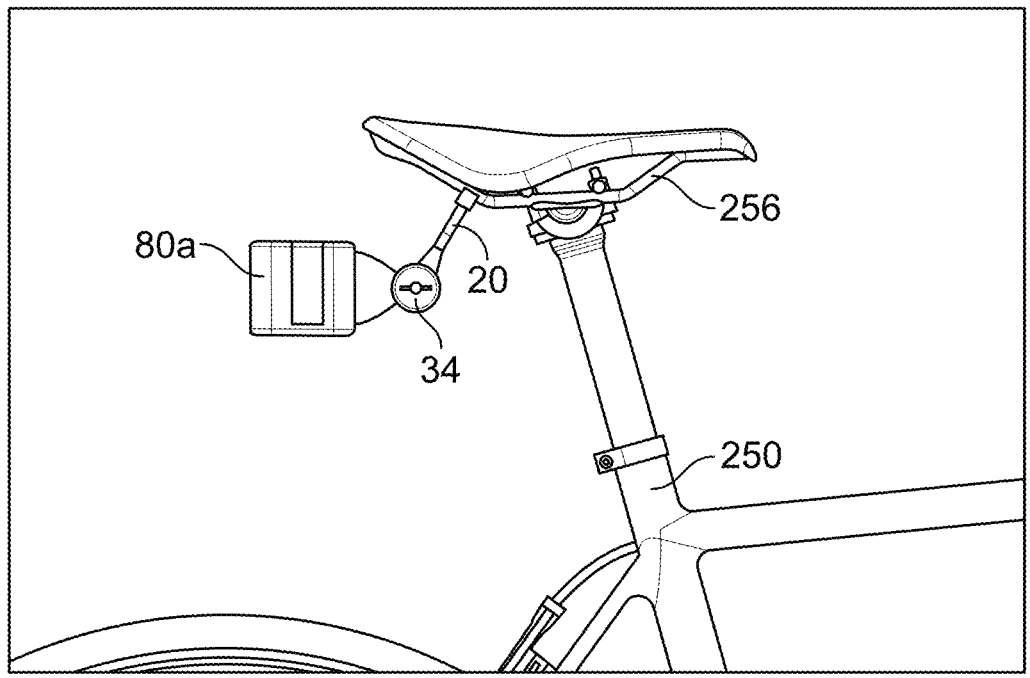
FIGS. 4 and 5 are side views of the bicycle-mountable carrier assembly of FIG. 1.
Figure 5:
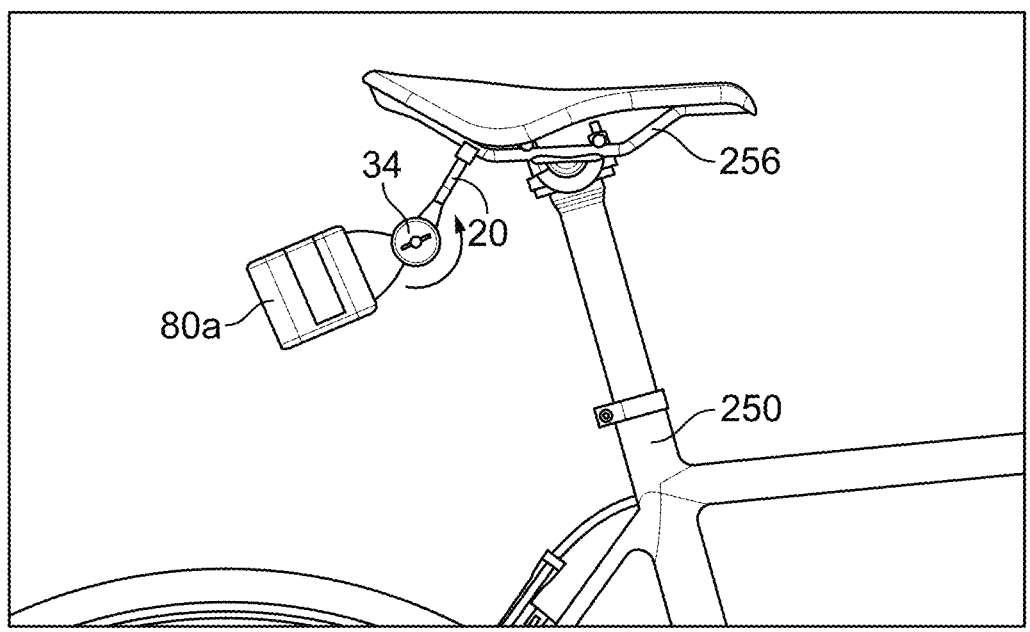

In this exemplary embodiment of the carrier assembly 100, the mounting assembly 20 supports two independent payload supports 80a, 80b, although any number of independent payload supports may be supported. Further, in this exemplary embodiment, each payload support is adjustably mounted to the mounting assembly 20, although in other embodiments payload supports may be fixed, and may not be adjustable in angle/orientation relative to the mounting assembly 20. More particularly, the mounting assembly 20, e.g., spreader 30, includes an attachment mechanism for adjustably securing a payload support in any one or multiple angular orientations relative to the mounting assembly. In this example, the spreader 30 terminates in a hub 32 threaded to receive a thumbscrew 34 for clamping a mating hub 82a, 82b of each payload support 80a, 80b therebetween. In this example, both the hub 32 and the mating hub 82 include complementary structures 83, such as stud/holes or teeth, that collectively define a plurality of detents for mating the hubs at a plurality of predefined angular orientations, and for engaging one another to secure mated hubs at a selected predefined angular orientation after the thumbscrew has been tightened to clamp a payload support therebetween. FIG. 4 shows a payload support 80a supported in a vertical/upright position relative to the bicycle 200, when the mounting assembly 20 is supported on the rails 256 of the bicycle and the bicycle in the upright position. By loosening the thumbscrew 34, moving the payload support 80a, and then tightening the thumbscrew 34, the pitch angle of the payload support 80a may be adjusted. FIG. 5 shows a payload support 80a supported in a non-vertical/tilted position relative to the bicycle 200, when the mounting assembly 20 is supported on the rails 256 of the bicycle and the bicycle in the upright position.

Figure 6:
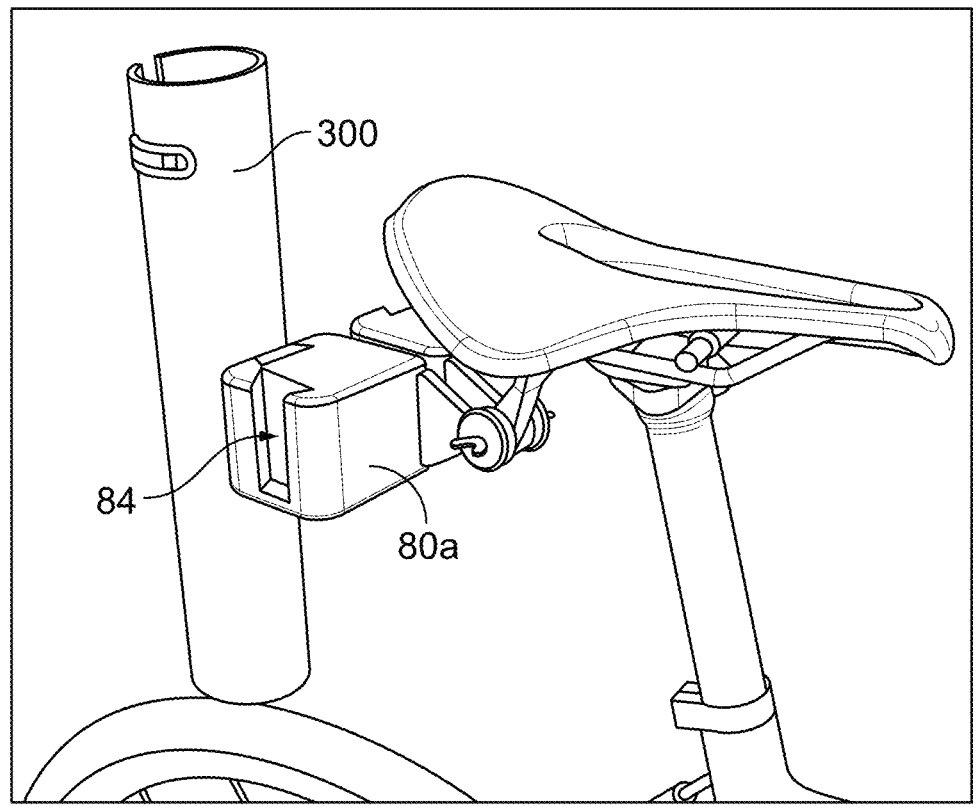
FIG. 6 is a perspective view of an exemplary fishing rod carrier attachment shown mounted to the bicycle-mountable carrier assembly of FIG. 1.
Figure 7:
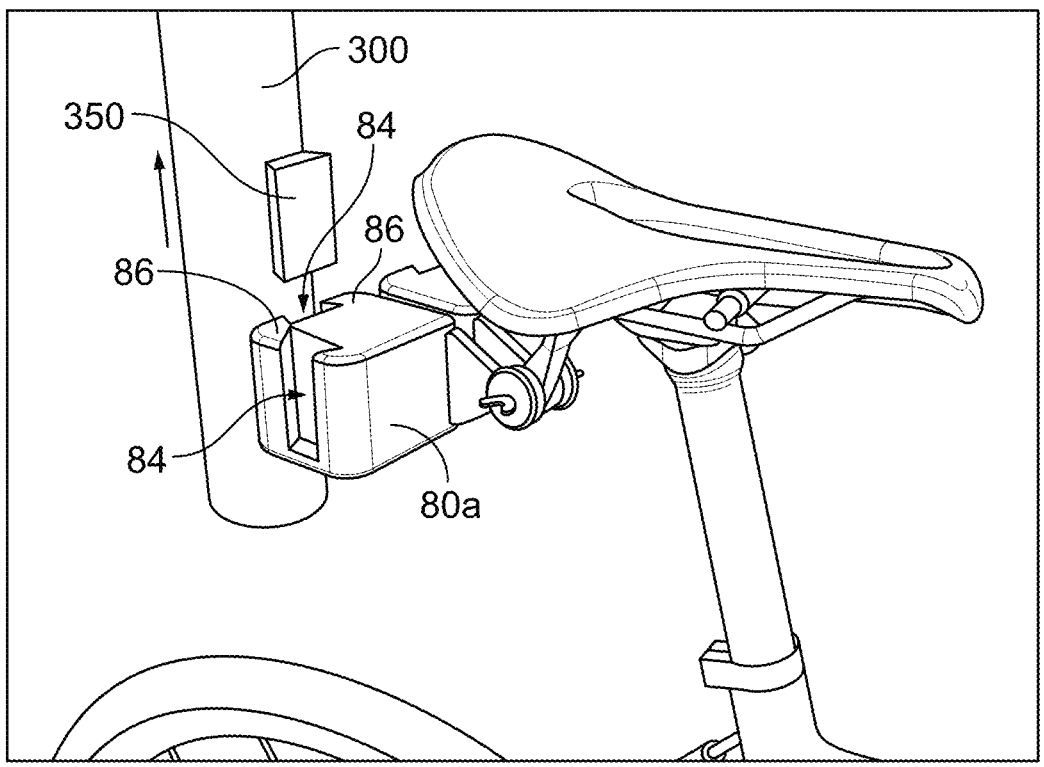
FIG. 7 is a perspective view of the fishing rod carrier attachment of FIG. 6 shown de-mounted to the bicycle-mountable carrier assembly of FIG. 1.

Each payload support 80a, 80b is configured to mate with payload-carrying attachments. In a preferred embodiment, each payload support 80a, 80b is configured to mate with payload-carrying attachments in a manner such that the attachments are mountable and demountable from the payload support in an easy and secure fashion manually, without the use of hand tools. In the exemplary embodiment, each payload support 80a, 80b defines a mounting structure, and each payload-carrying attachment defines a complementary mounting structure. In the example shown, each payload support 80a, 80b defines a channel 84 open at one (e.g., upper) face of the payload support 80a, 80b, and closed at the other (lower) face of the payload support 80a, 80b, as shown in FIGS. 6 and 7. Further, the exemplary embodiment defines a channel 84 having reentrant sidewalls 86. In this manner, the channel has a keystone-shaped cross-section that allows a complementary keystone-shaped mounting boss 350 of a payload-carrying attachment 300 to slide longitudinally within the channel 84 for mounting/demounting purposes, but to prevent the mounting boss 350 from existing the channel laterally, so as to retain the mounting boss 350 within the channel 84 in secure fashion.

Figure 8:
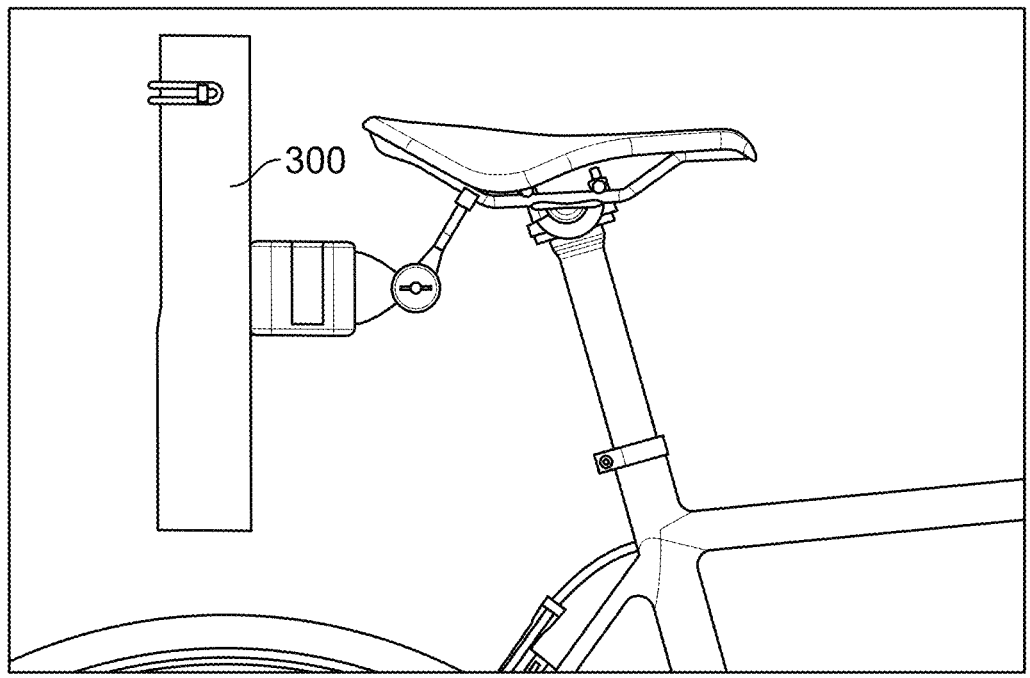
FIGS. 8 and 9 are side views of the fishing rod carrier attachment of FIG. 6 shown mounted to the bicycle-mountable carrier assembly of FIG. 1.
Figure 9:
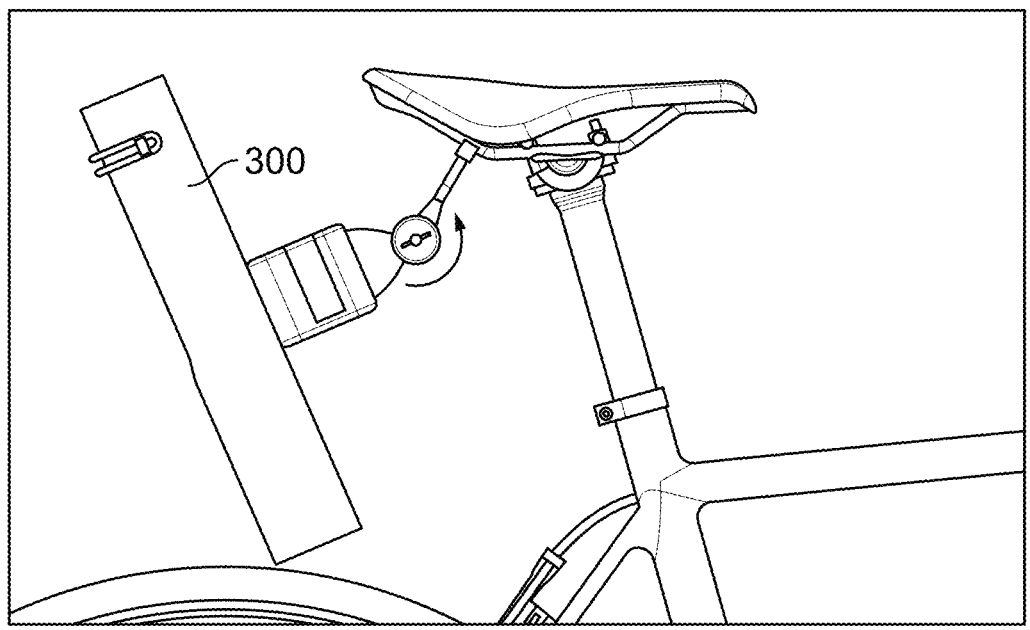

FIG. 6 shows an exemplary fishing rod carrier attachment 300 with its mounting boss 350 mated with a rearward-facing channel 84 of the carrier assembly 100. FIG. 7 shows is a perspective view of the fishing rod carrier attachment 300 demounted from the carrier assembly. FIGS. 8 and 9 are side views of the fishing rod carrier attachment 300 6 shown mounted to the bicycle-mountable carrier assembly of FIG. 1 in vertical/upright, and non-vertical/tilted positions, respectively.

Figure 10:
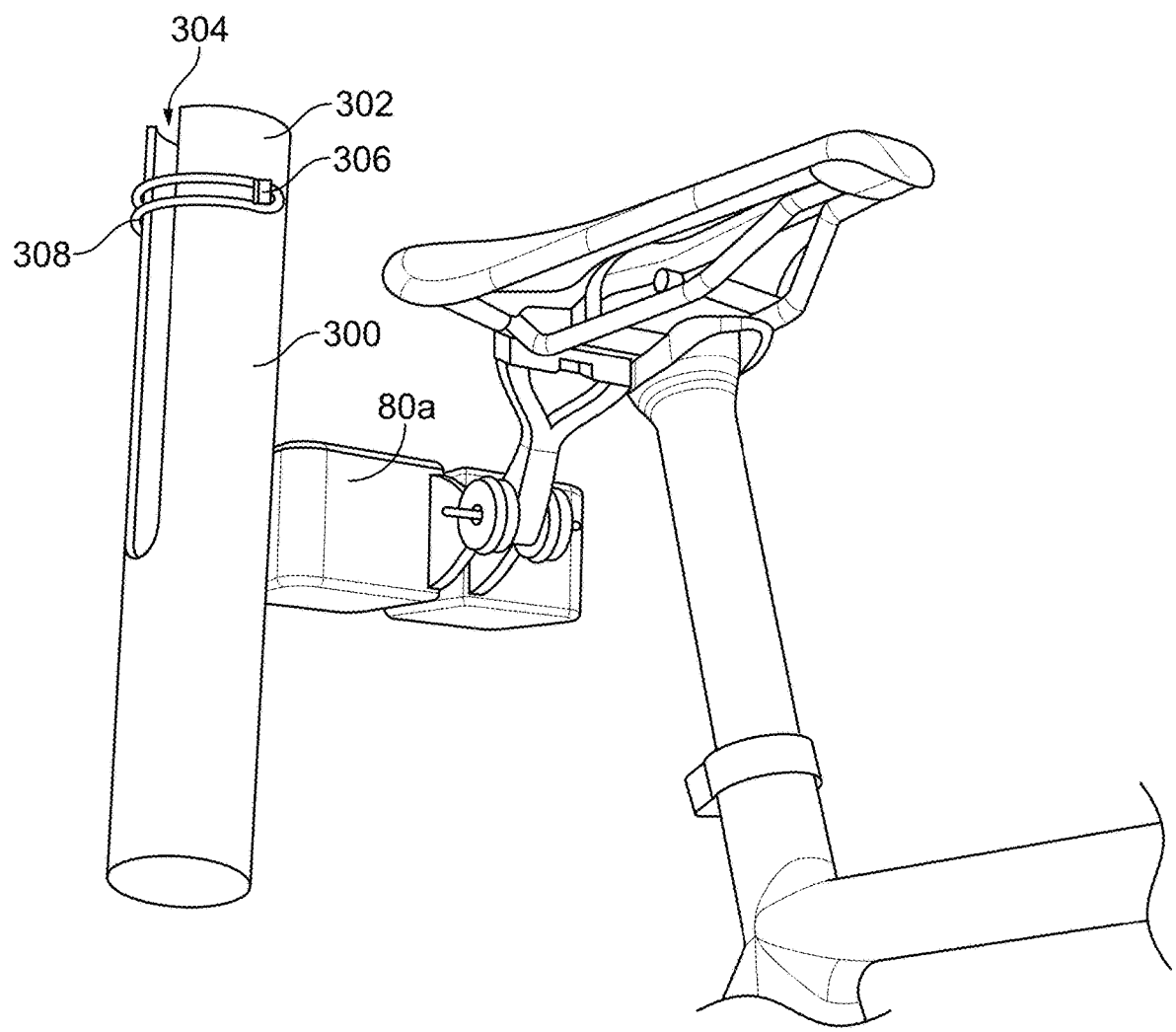
FIG. 10 is a perspective view of the fishing rod carrier attachment of FIG. 6 shown mounted to an alternative mounting point of the bicycle-mountable carrier assembly of FIG. 1.

In the example shown, each payload support 80a, 80b defines plurality of such channel 84, so that more than one carrier attachment may be mounted to each payload support, or so that a single carrier attachment may be mounted at multiple different locations on a single payload support. As will be appreciated from FIGS. 6-9, each payload support 80a defines a first (e.g., rearward-facing) channel 84 and a second (e.g., side-facing) channel 84. In FIGS. 6-9, the carrier attachment 300 is mounted to the carrier assembly 100 via a rearward-facing channel 84. In FIG. 10, the carrier attachment 300 is mounted to the carrier assembly 100 via a side-facing channel 84.

Carrier attachments 300 may have any suitable configuration, e.g., for carrying large and/or elongated items. Each compatible carrier attachment includes a complementary mounting boss 350, so as to be usable in conjunction with the carrier assembly 100 as part of the carrier system. FIG. 10 shows an exemplary fishing rod carrier attachment 300 suitable for carrying an elongated fishing rod on the carrier assembly 100, and thus on the bicycle 200. This exemplary fishing rod carrier attachment 300 includes an elongated tube 302 defining an elongated channel 304 in its sidewall extending part of the length of the tube, and open at the top of the tube. The tube 302 and channel 304 allow for the proximal end/handle of a fishing rod to be inserted into the tube 302, with the rod's reel structure pass through the sidewall via the channel 304, while allowing the rod to site relatively low within the tube 302, and thus to be surely retained. The exemplary carrier attachment 300 further includes a pair of bosses 306 positioned about the circumference of the external surface of the tube 302 on opposite sides of the channel 304, e.g., near the top end of the tube, and an elastic member 308 securable to the bosses 306. In this manner, the member 308 can be removed from at least one boss 306, the rod's reel may be passed through the channel 304, and then the member 308 may be secured to the at least one boss to provide a physical obstruction preventing the reel from texting the channel 304, and the rod from exiting the tube 302, which helps to ensure secure retention of the rod payload within the rod carrier attachment 300 during bicycling.

Figure 12:
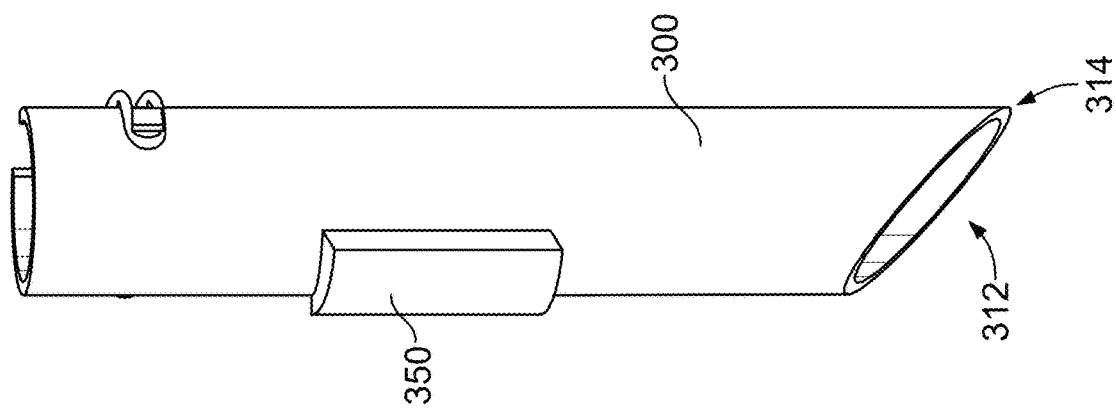
FIGS. 11 and 12 are a perspective views of alternative fishing rod carrier attachments in accordance with an alternative embodiment of the present invention.
Figure 11:
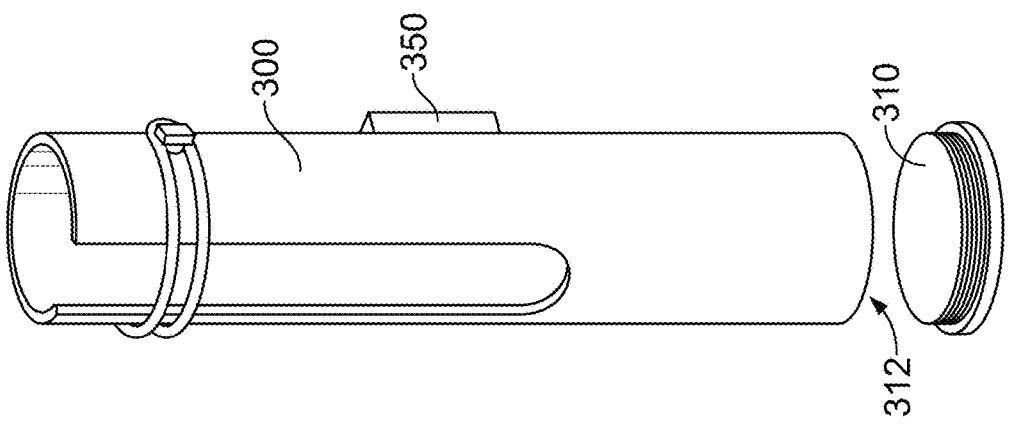

FIGS. 11 and 12 are a perspective views of alternative fishing rod carrier attachments 300 in accordance with an alternative embodiment of the present invention. The exemplary embodiment of FIG. 11 further includes a cap 310 mounted to be easily removable at a lower end of the tube 302. In the alternative exemplary embodiment of FIG. 12, the lower end 312 of the tube 302 is shaped to form a point 314, so that the tube may be used as a "sand spike" during fishing, by driving the fishing rod carrier attachment 300 into sand or dirt adjacent a body of water, and resting the rod within the attachment as is a common fishing practice.

Figure 13:
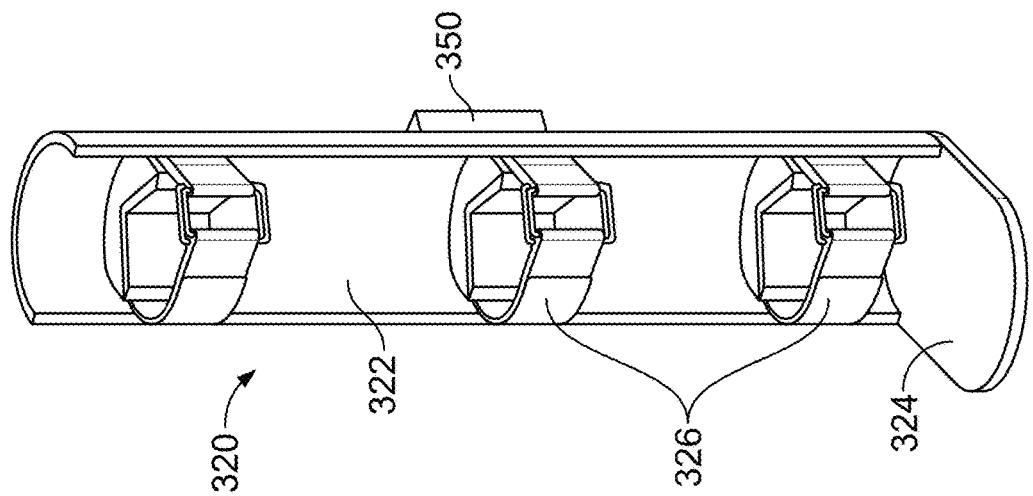
FIG. 13 is a perspective view of an exemplary fishing rod case carrier attachment in accordance with an embodiment of the present invention.

FIG. 13 is a perspective view of an exemplary fishing rod case carrier attachment 320. The rod case carrier attachment includes a compatible mounting boss 350 and is structured as a laterally-open bracket 322 having a lower lip 324 for supporting a fishing rod case in a vertical direction, and adjustable and releasably securable straps 326 for lashing a rod case to the open bracket and supporting it in a horizontal direction. By way of example, straps 326 including fields of hook-and loop-fastener, and/or adjustable buckles are suitable for this purpose.

Figure 14:
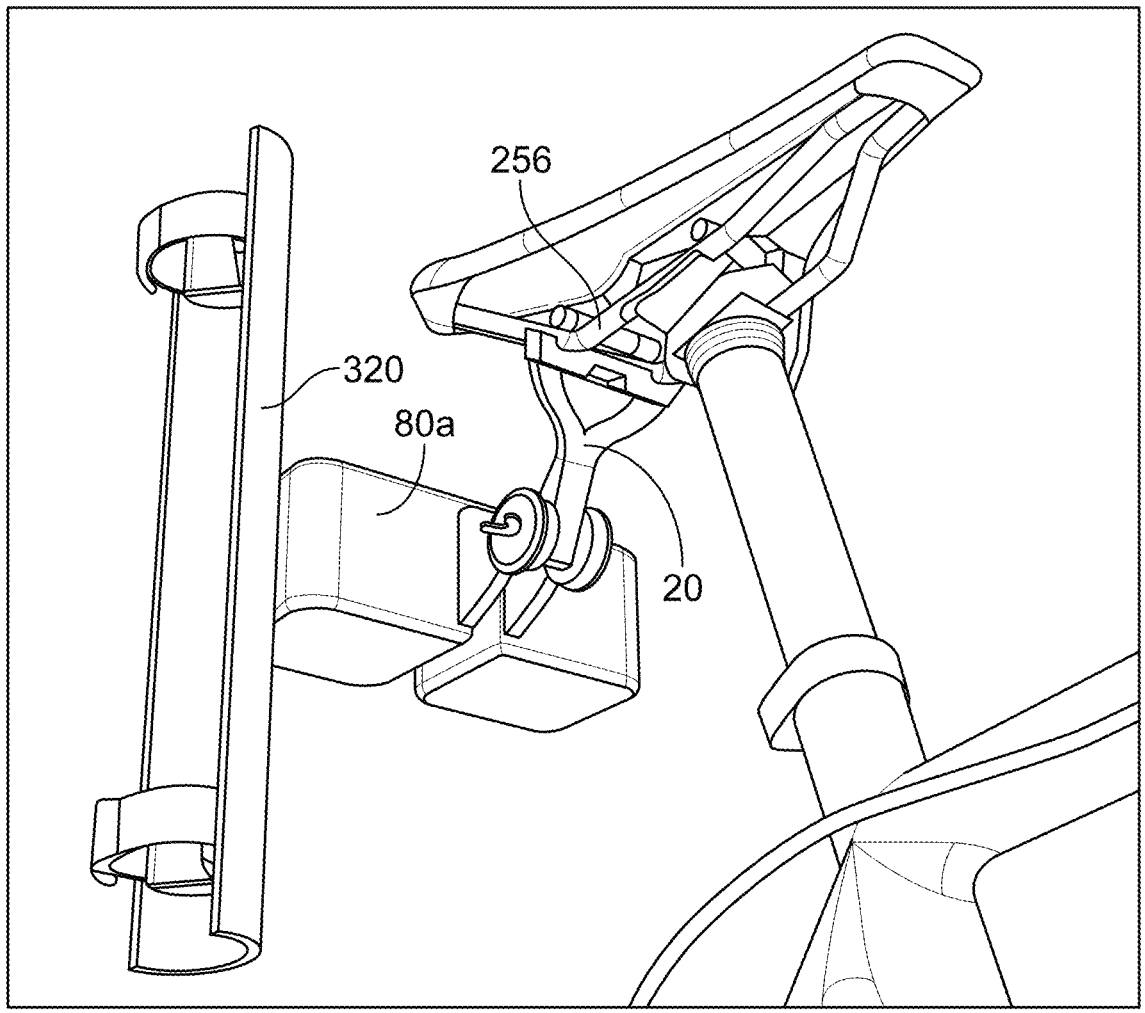
FIG. 14 is a perspective view of the fishing rod case carrier attachment of FIG. 13 shown mounted to the bicycle-mountable carrier assembly of FIG. 1.
Figure 15:
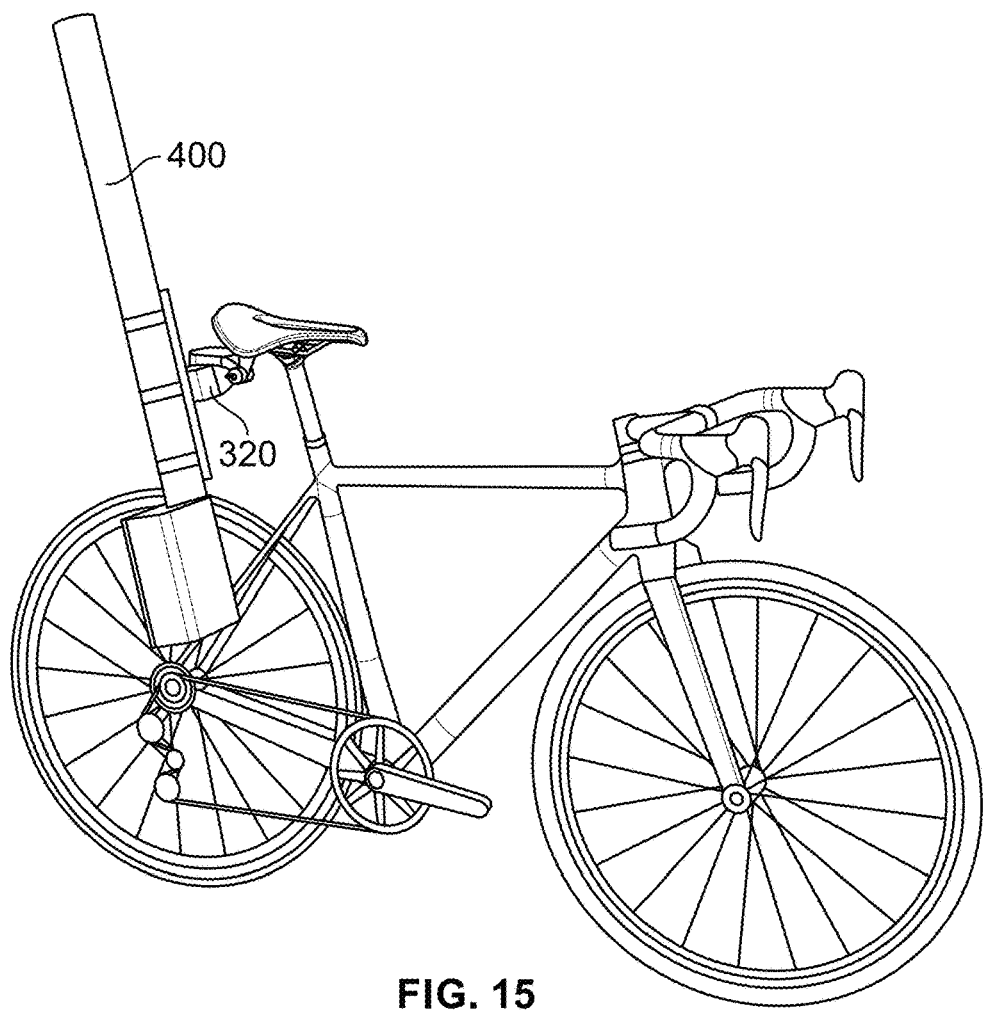
FIGS. 15 and 16 are perspective views of the fishing rod case carrier attachment of FIG. 13 shown mounted to the bicycle-mountable carrier assembly of FIG. 1 and carrying an exemplary fishing rod case.
Figure 16:
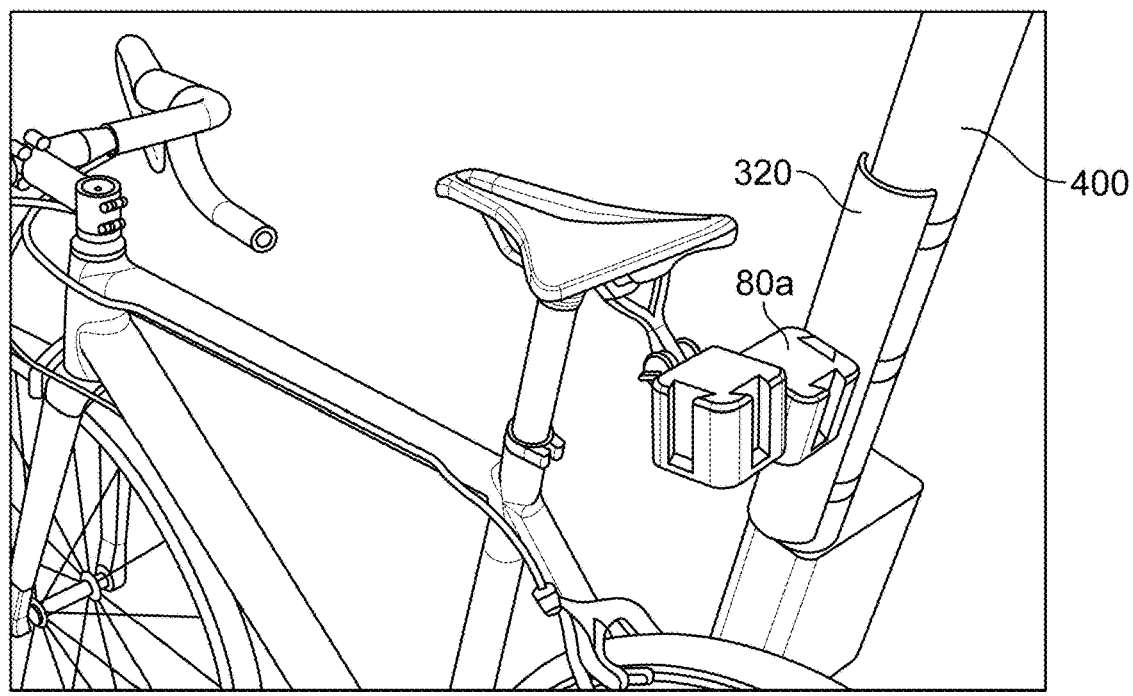
Figure 18:
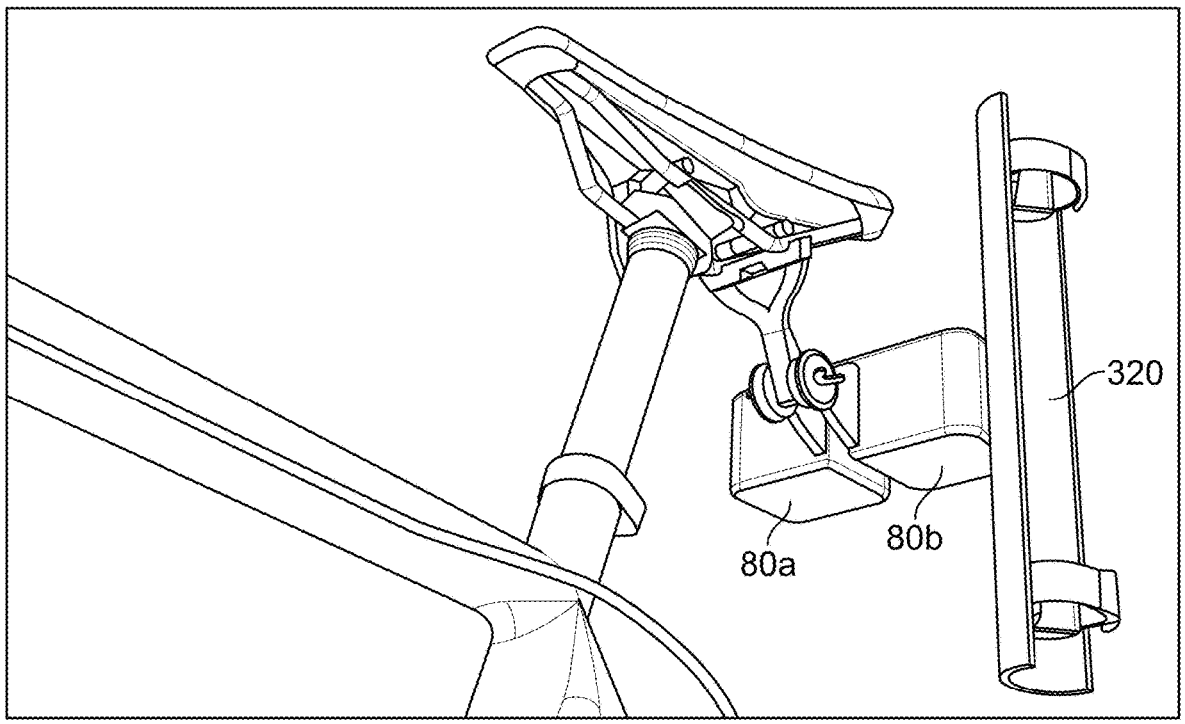
FIGS. 18 and 19 are perspective views of the fishing rod case carrier attachment of FIG. 13 shown mounted to the alternative bicycle-mountable carrier assembly of FIG. 17 in two different spatial orientations.

FIG. 14 shows the fishing rod case carrier attachment 320 mounted in a side-facing channel 84 of a payload assembly 80a of the bicycle-mountable carrier assembly 100. FIGS. 15 and 16 are perspective views of the fishing rod case carrier attachment 320 shown carrying a fishing rod case 400 and mounted to the bicycle-mountable carrier assembly 100. As will be noted, the side-mounted channel may be particularly advantageous for mounting elongated items, which may be positioned to extending alongside the rear-wheel, e.g., for rod case carrier or other attachments that do not include a lower lip 324, e.g., as shown in FIG. 18.

Figure 17:
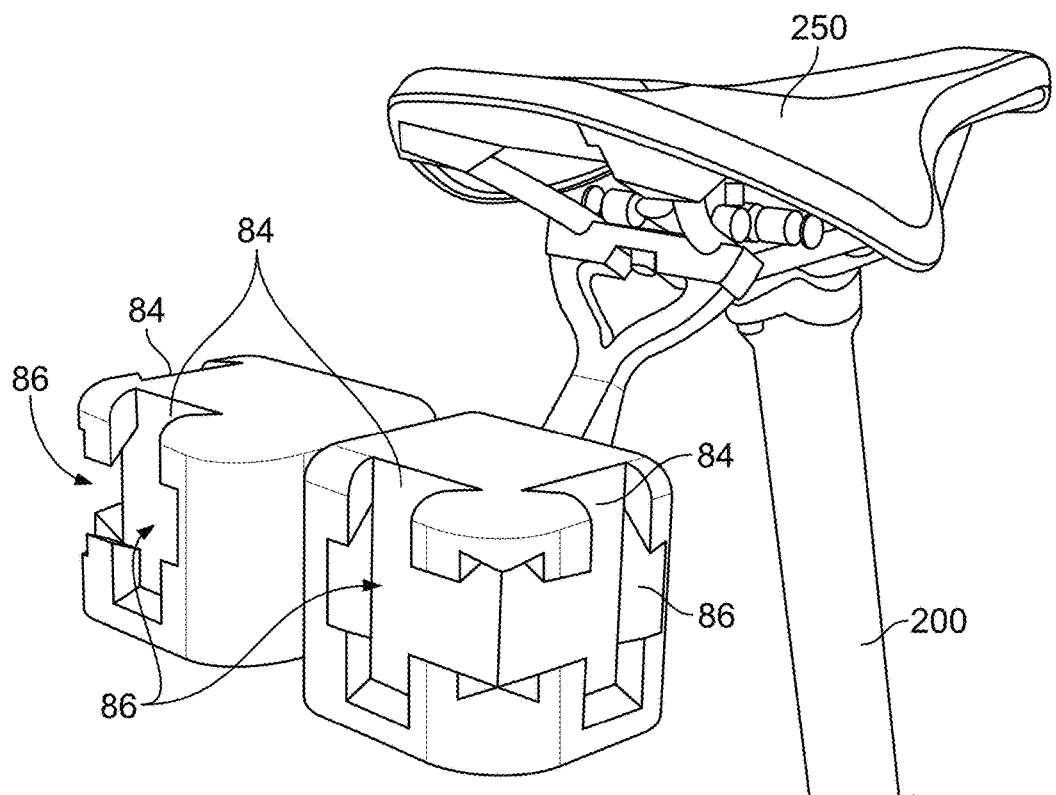
FIG. 17 is a perspective view of an alternative bicycle-mountable carrier assembly shown attached to an exemplary saddle of an exemplary bicycle in accordance with an alternative embodiment of the present invention.
Figure 19:
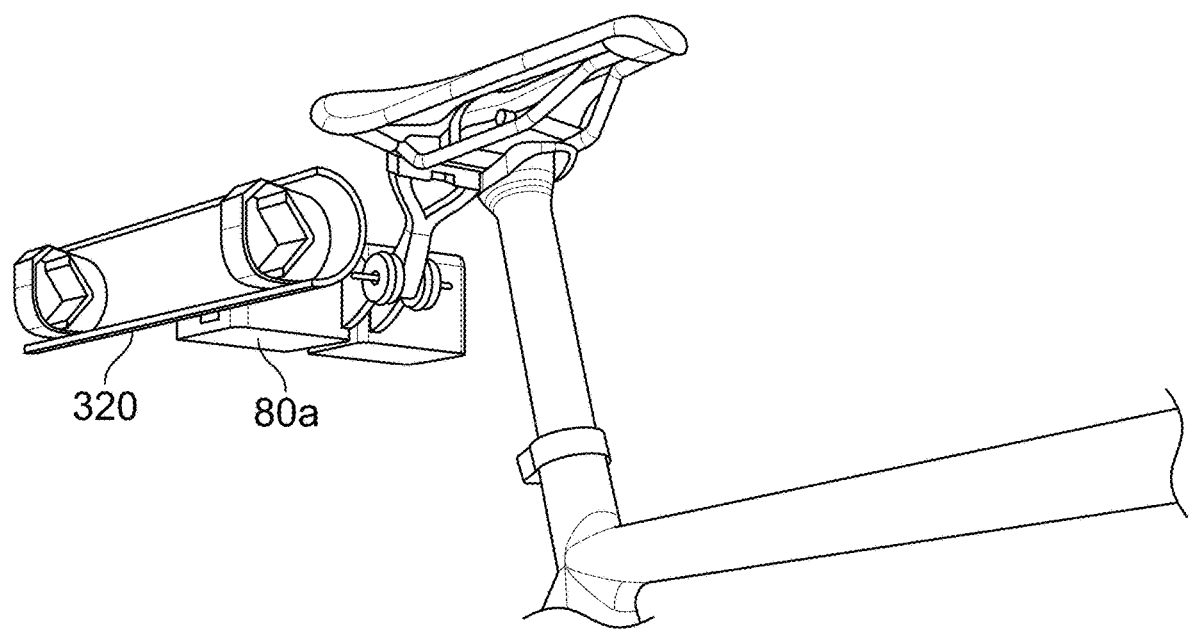
Figure 20:
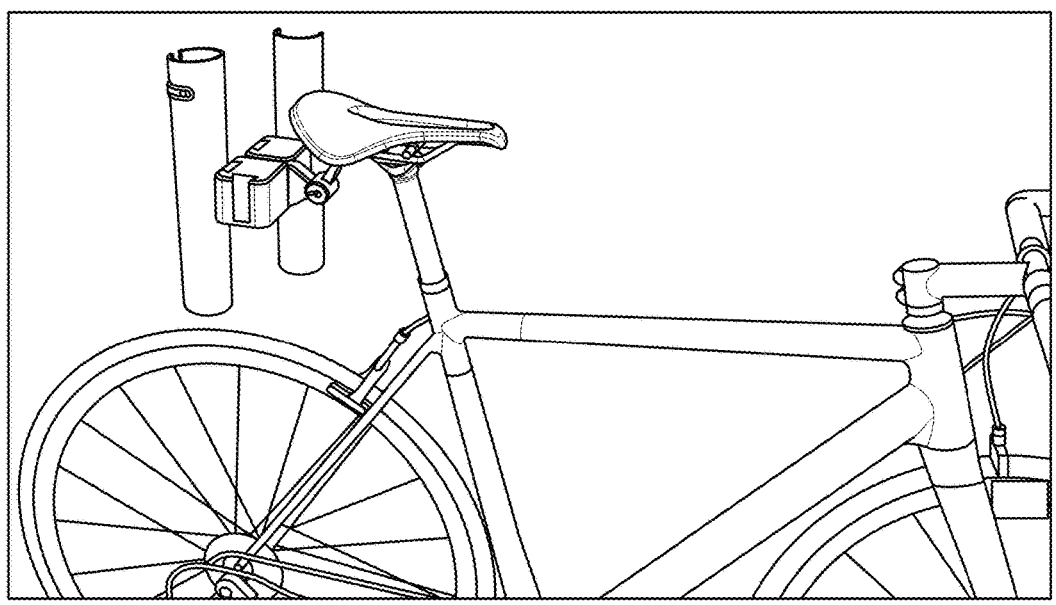
FIG. 20 is a perspective view of two fishing rod carrier attachment of FIG. 6 shown mounted to the bicycle-mountable carrier assembly of FIG. 17.

FIG. 17 is a perspective view of an alternative bicycle-mountable carrier assembly 100 shown attached to an exemplary saddle 250 of an exemplary bicycle 200. In this exemplary embodiment, each payload support 80a, 80b defines plurality of mounting channels 84, so that more than one carrier attachment may be mounted to each payload support, or so that a single carrier attachment may be mounted at multiple different locations on a single payload support, similar to the embodiment described above. Accordingly, each payload support, e.g., 80a, defines a first (e.g., rearward-facing) channel 84 and a second (e.g., side-facing) channel 84. These channels are referred to here as primary channels, for mounting the accessory attachments in a primary spatial orientation. In accordance with this alternative embodiment, the payload support, e.g., 80*a*, further defines one or more secondary channels 84, for mounting accessory attachments in a secondary spatial orientation different from the primary spatial orientation. The secondary channels 84 may be similar in structure to those of the primary channels, so that accessories have mounting bosses 350 may be inserted into any of the primary and secondary channels 84. In the exemplary embodiment of FIG. 17, the exemplary secondary channels 86 are oriented perpendicularly to the exemplary primary channels 84 on both the rearward-facing and side-facing surfaces of the payload support 80*a*. In this example, primary and secondary channels intersect one another. Accordingly, for example, rod case carrier assembly 300 can be mounted to a side of a payload support 80*a*, 80*b* in a vertical position, using a primary channel 84, or in horizontal position, using a secondary channel 84, as shown in FIGS. 18 and 19. FIG. 20 is shows a fishing rod carrier attachment 320 mounted to each of the rearward-facing and side-facing primary channels of payload supports 80*a* and 80*b*.

Figure 21:
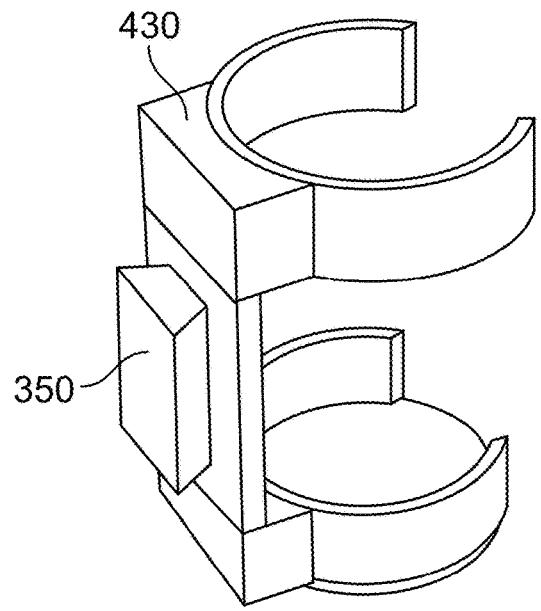
FIG. 21 is a perspective view of an exemplary water bottle carrier attachment.
Figure 22:
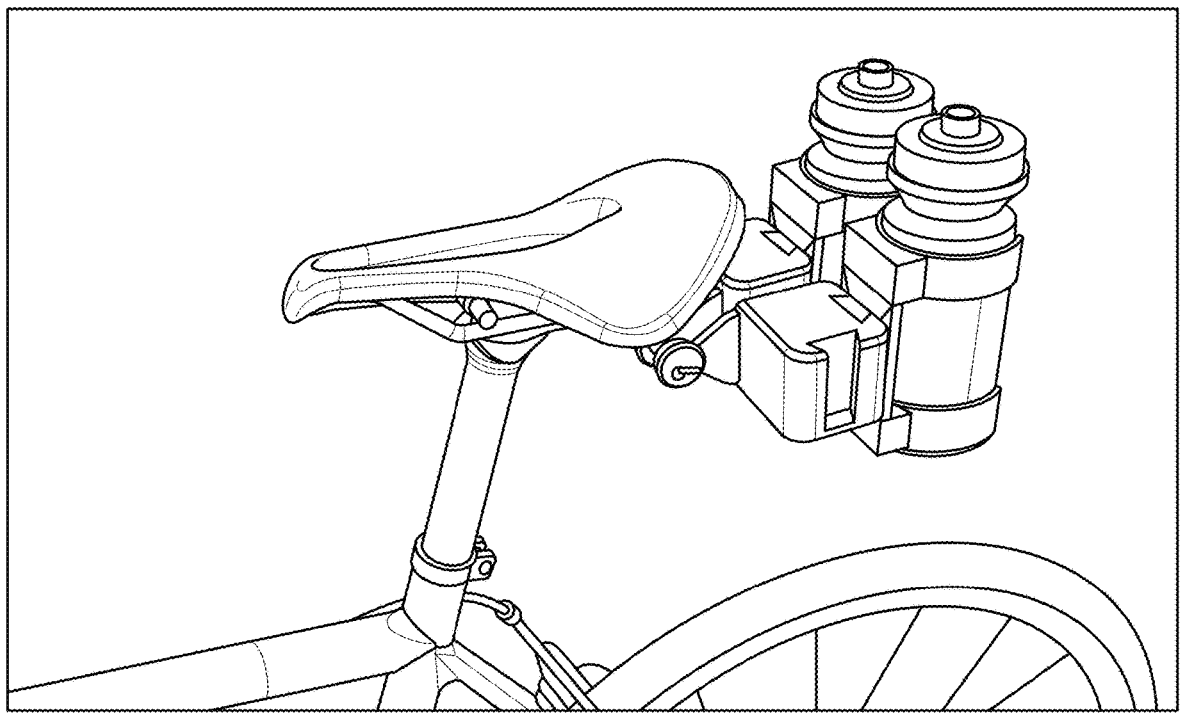
FIG. 22 is a perspective view of two water bottle carrier attachments of FIG. 21 shown mounted to the bicycle-mountable carrier assembly of FIG. 17.
Figure 23:
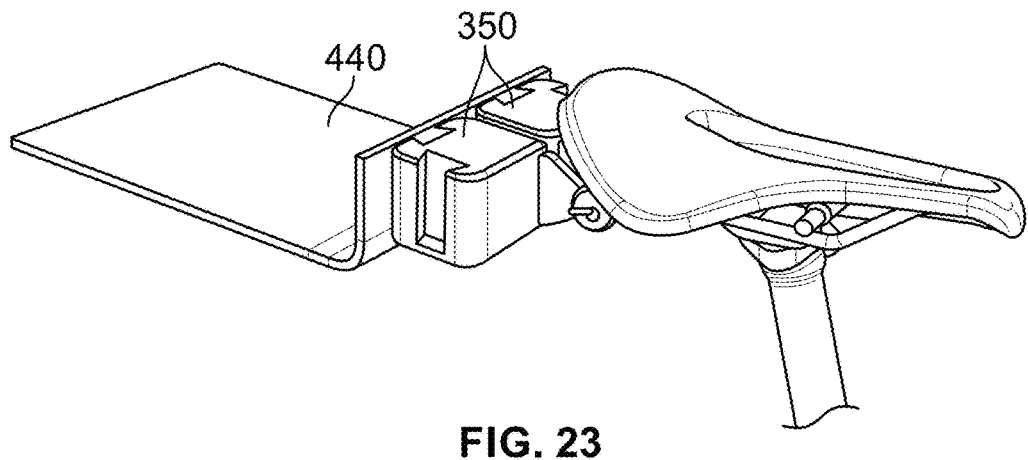
FIG. 23 is a perspective view of a tackle box carrier attachment shown mounted to the bicycle-mountable carrier assembly of FIG. 17.
Figure 24:
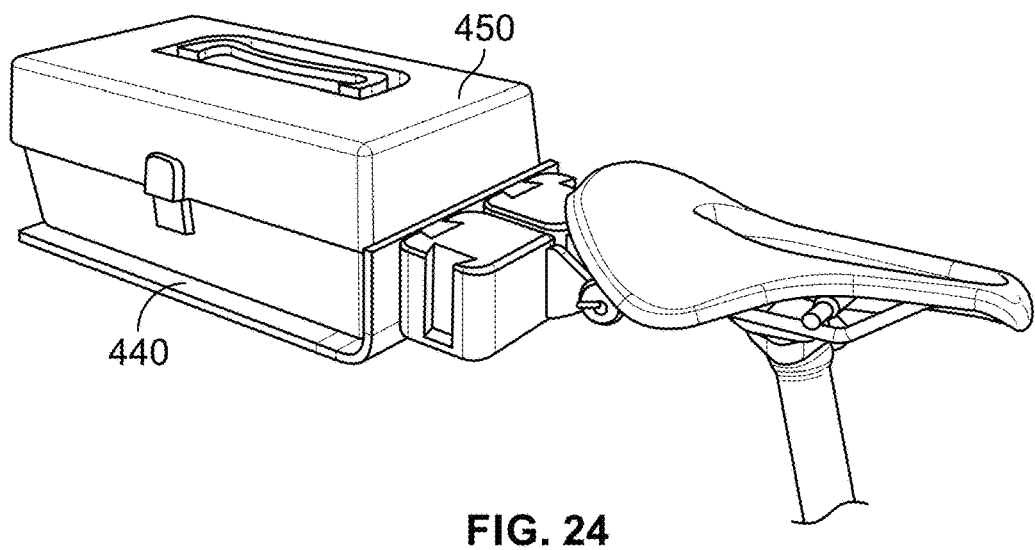
FIG. 24 is a perspective view of a tackle box shown supported on the tackle box carrier attachment of FIG. 23.

It will be appreciated that any suitable payload accessories including a complementary mounting boss 350 may be used as part of a carrier system including the mounting assembly, carrier assembly, and payload attachment accessory. By way of example, FIG. 21 shows exemplary water bottle carrier attachment accessory 430 including a conforming mounting boss 350. FIG. 22 shows two such water bottle carrier attachment accessories of FIG. 21 mounted to the bicycle-mountable carrier assembly 100 of FIG. 17, shown holding two water bottles. FIG. 23 is a perspective view of a tackle box carrier platform attachment accessory 440 shown mounted to the bicycle-mountable carrier assembly of FIG. 17. FIG. 24 is a perspective view of a tackle box 450 shown supported on the tackle box carrier platform attachment accessory 440.

Figure 25:
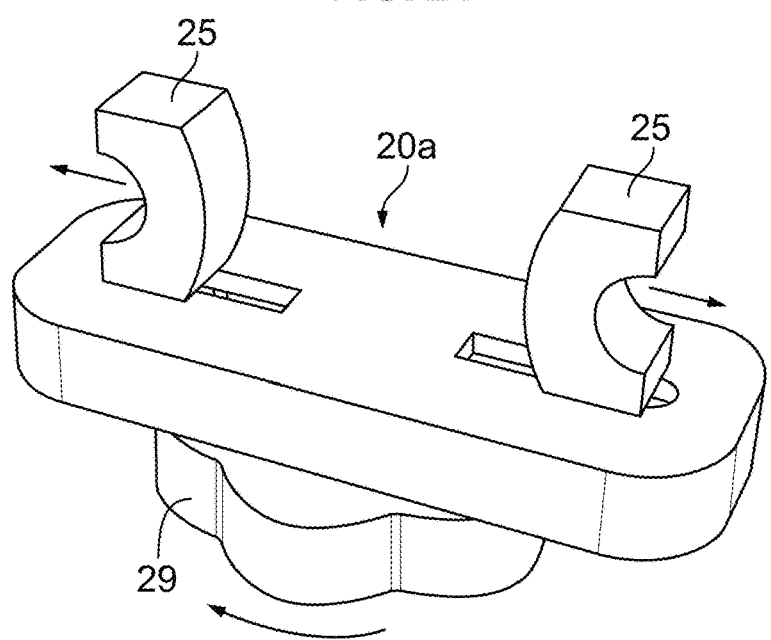
FIG. 25 is a partial perspective view of an alternative mounting assembly for the bicycle-mountable carrier assembly in accordance with another exemplary embodiment of the present invention.
Figure 26:
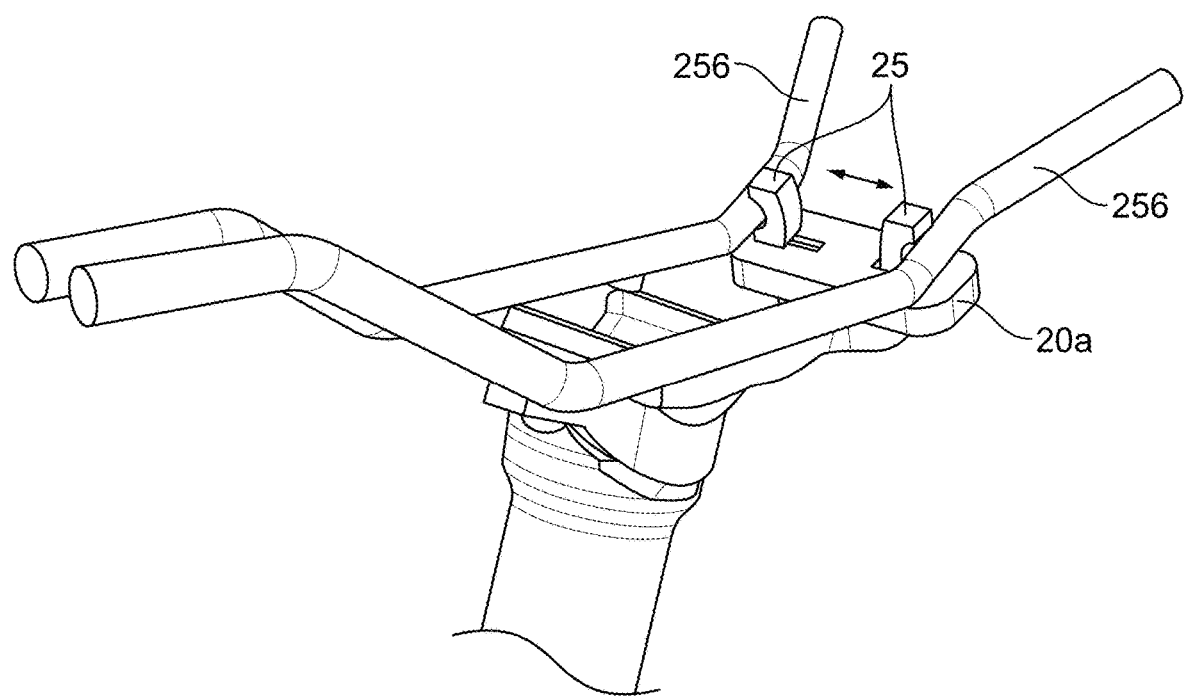
FIG. 26 is a partial perspective view of the mounting assembly of FIG. 25 shown mounted to a saddle's seat rails.
Figure 27:
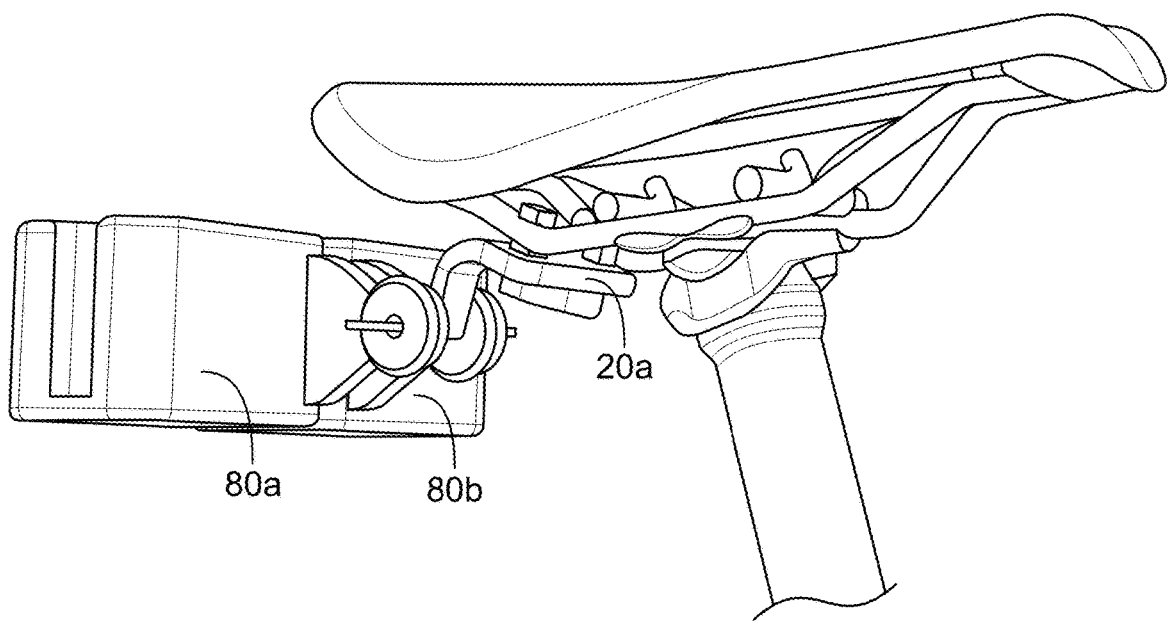
FIG. 27 is a perspective view of a bicycle-mountable carrier assembly including the mounting assembly of FIG. 25 shown mounted to a saddle's seat rails.
Figure 28:
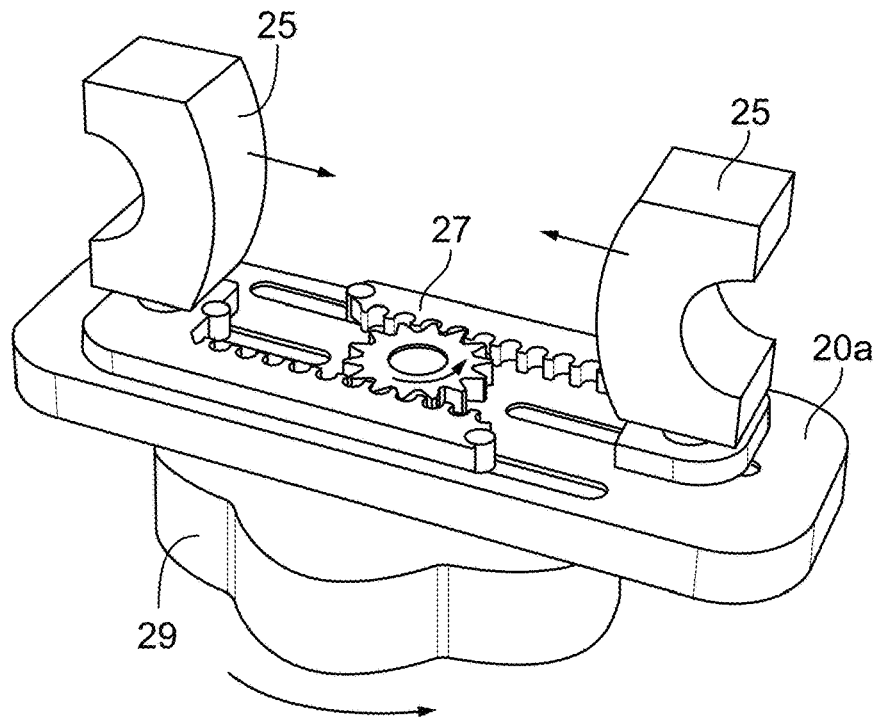
FIG. 28 is a partial perspective view of the alternative mounting assembly of FIG. 25, shown with a cover removed for illustrative clarity.

It should be appreciated that the mounting assembly 20 may have any suitable configuration. FIG. 25 shows an alternative mounting assembly 20*a* for the bicycle-mountable carrier assembly. In this embodiment, the clamp does not upper and lower jaws adjustable by a thumbscrew, but rather includes a pair of opposed jaws 25 interconnected by a ratcheting rack-and-gear system 27, as shown in FIG. 28. In this manner, a drive handle 29 attached to the ratcheting rack-and-gear system 27 drives the gear to separate the jaws and effectively cause them to engage and clamp against the rails 256 of a saddle, as shown in FIGS. 26 and 27.

FIGS. 29-33 shown an alternative bicycle-mountable carrier assembly 100*a*. This embodiment is similar to that shown and described with reference to FIG. 1 in many respects. In this embodiment of the carrier system, each mounting boss 350 defines a socket 352 for receiving a catch 92 from a locking mechanism 90 of a payload support 80*a*, 80*b*. Again, the mounting boss 350 and channel 84 of the payload support 80*a*, 80*b* are keyed, but in this case, the channels are T-shaped, rather than keystone-shaped in cross-section, by way of alternative example. More notably for this alternative embodiment, each payload support 80*a*, 80*b* includes a locking mechanism 90 including a resiliently-biased catch 92, which in this case is formed as part of a pivotably supported lever 94 biased by a tab 96 acting somewhat like a spring to be deformed and resile upon actuation of the lever to resiliently bias the catch 92. Insertion of a mounting boss 350 of an attachment accessory into a channel 84 of payload support 80*a*, 80*b* causes interference and displacement of the biased catch 92 until the catch 92 aligns with the socket 352 of the mounting boss 350, at which time the deflected tab 96 causes the catch 92 to resile and seat within the socket 352. The catch 92 then acts as a positive stop to prevent removal of the mounting boss/accessory, and to retain the attachment accessory on the carrier assembly 100. When desired, a user can manually depress the lever 94 to cause the catch 92 to exit the socket 352, at which time the mounting boss 350 may be removed from the channel 84 of the payload support 90*a*, 80*b*, and the accessory may be removed from the carrier assembly 100 and from the bicycle 200.

Figure 29:
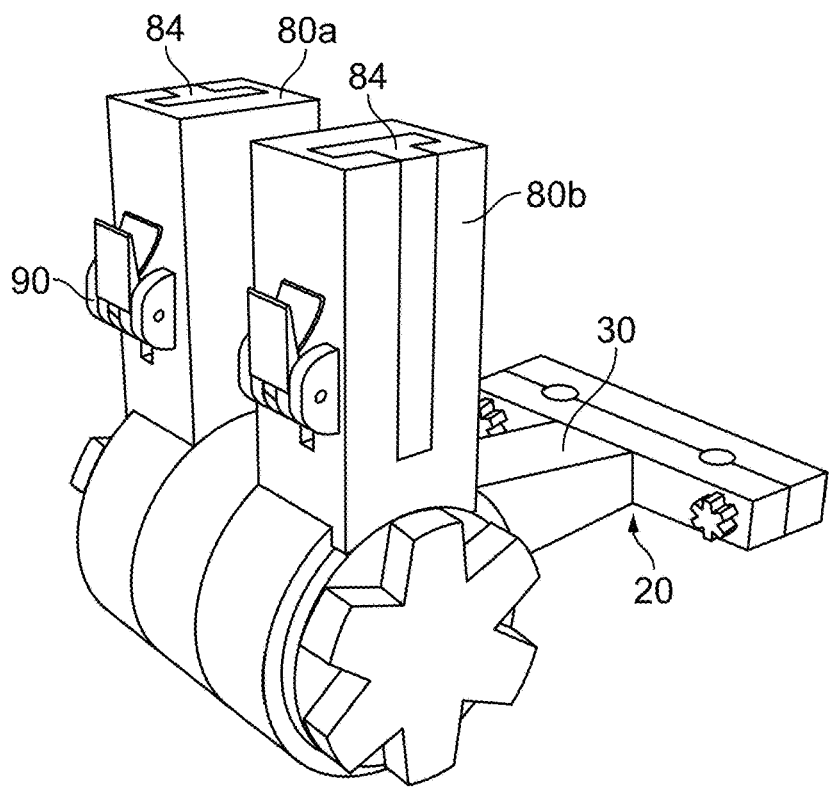
FIG. 29 is a perspective view of an exemplary alternative bicycle-mountable carrier assembly in accordance with another exemplary embodiment of the present invention.
Figure 30:
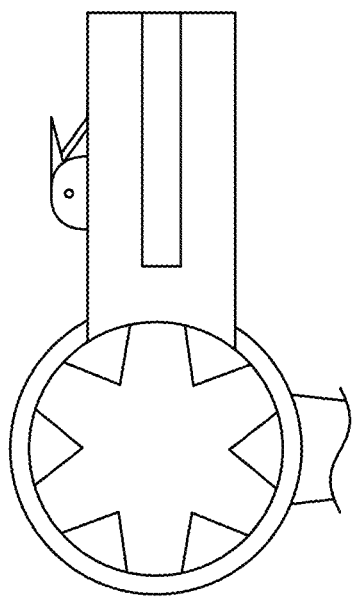
FIG. 30 is a side view of the alternative bicycle-mountable carrier assembly of FIG. 29, shown with a payload attachment release button in the locked position.
Figure 31:
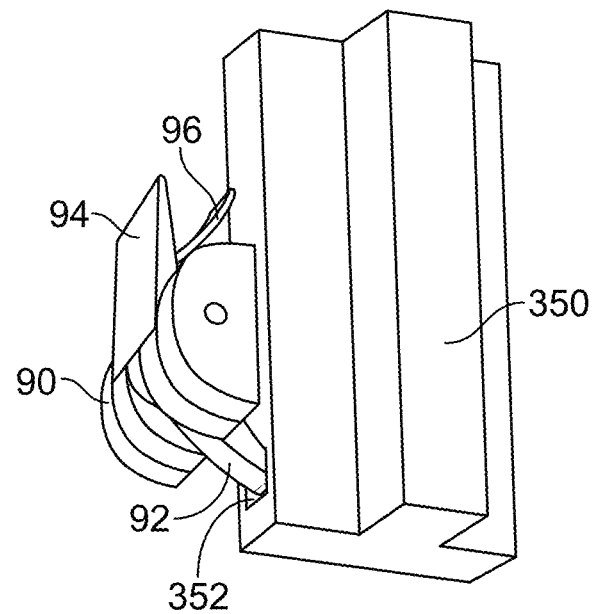
FIG. 31 is a partial perspective view of the alternative bicycle-mountable carrier assembly of FIG. 29, shown with a payload attachment release button in the locked position.
Figure 32:
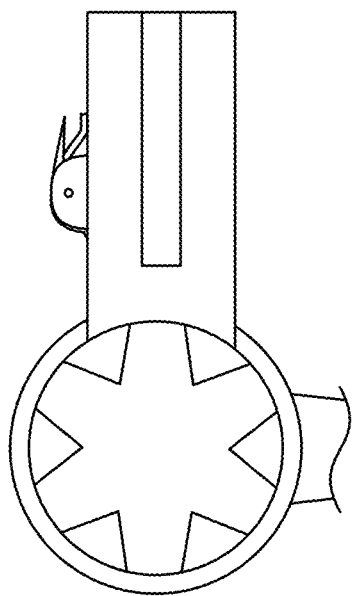
FIG. 32 is a side view of the alternative bicycle-mountable carrier assembly of FIG. 29, shown with a payload attachment release button in the unlocked position.
Figure 33:
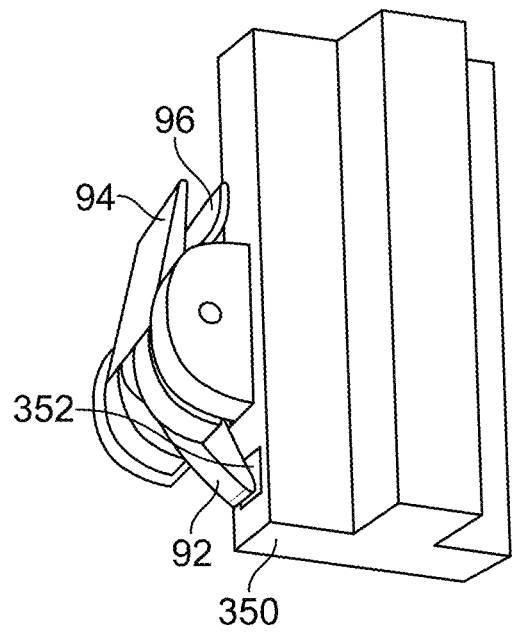
FIG. 33 is a partial perspective view of the alternative bicycle-mountable carrier assembly of FIG. 29, shown with a payload attachment release button in the unlocked position.
Figure 35:
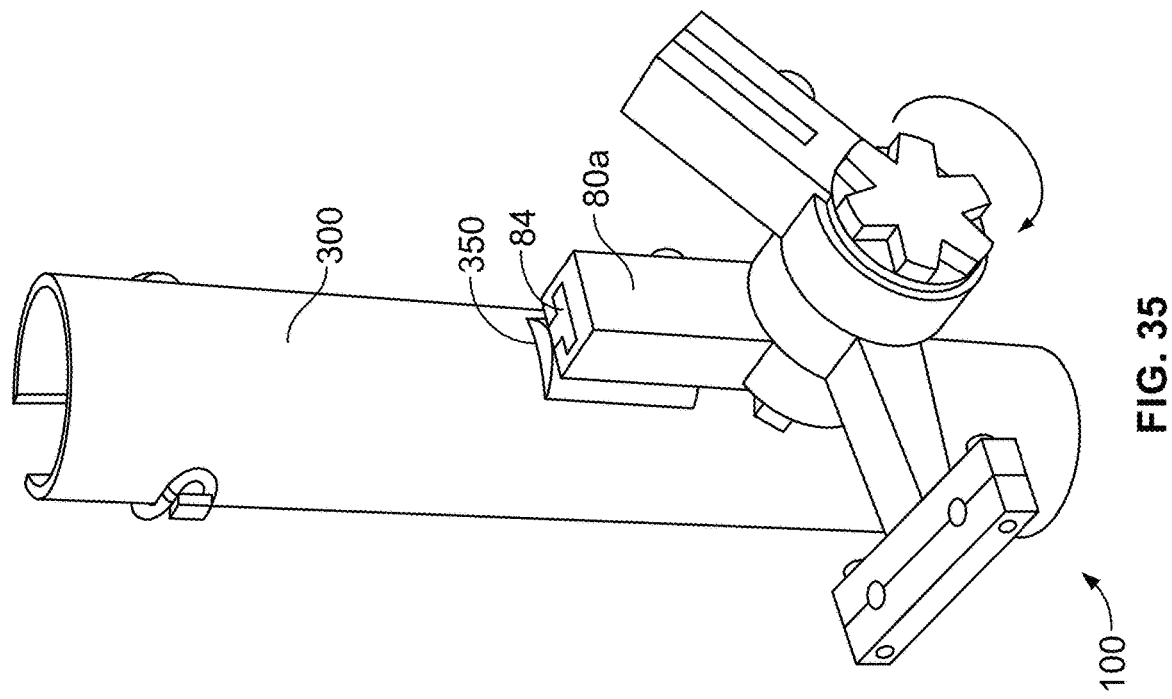
FIGS. 34 and 35 are perspective views of the fishing rod carrier attachment of FIG. 6 shown mounted to the alternative bicycle-mountable carrier assembly of FIG. 29.
Figure 34:
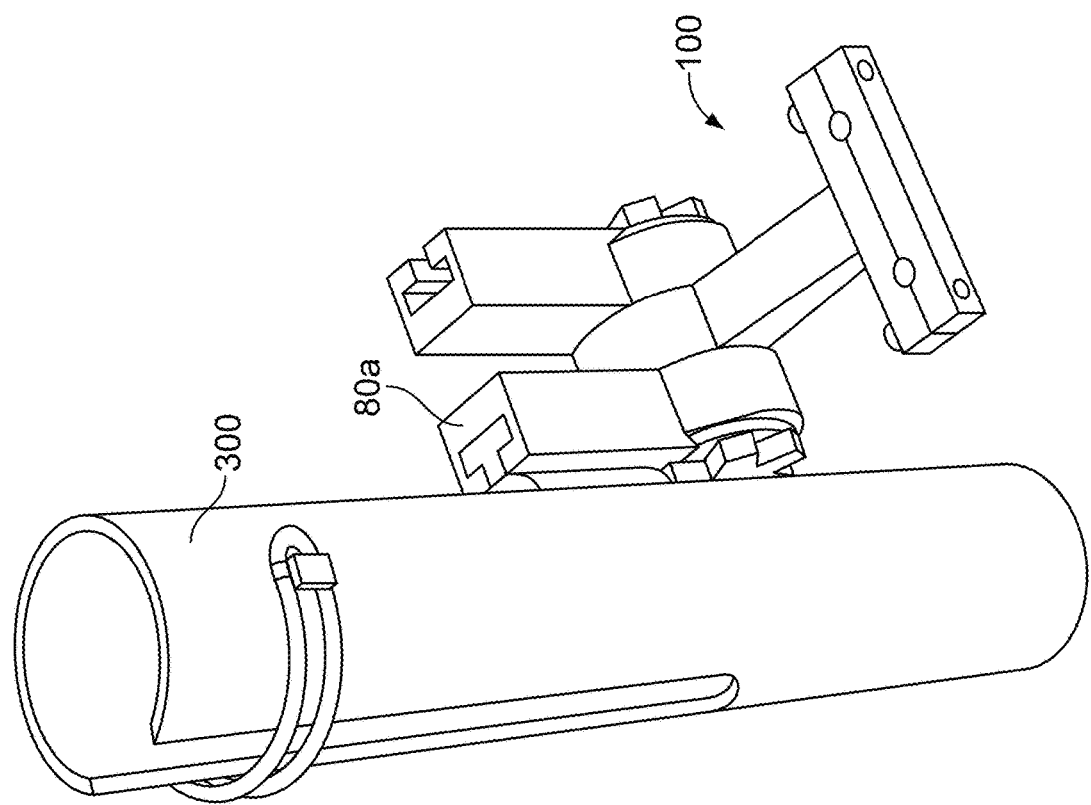

For illustrative purposes, FIGS. 34 and 35 show the fishing rod carrier attachment 300 of FIG. 6 mounted to the alternative bicycle-mountable carrier assembly 20*a* of FIG. 29.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A carrier assembly mountable to rails of a saddle of a bicycle, the carrier assembly comprising:

a mounting assembly adapted for attachment to at least one rail of the saddle to secure said mounting assembly thereto;

at least one payload support joined to said mounting assembly, said at least one payload support having a first side and a second side extending transversely to said first side, each of said first side and said second side defining a respective mounting structure for supporting a payload carrier attachment for carrying a payload as carried by a payload carrier attachment, each said mounting structure being defined as one of an elongated channel having a closed end and an elongated boss dimensioned to be received in said channel, each of said elongated channel and said elongated boss being shaped in cross-section, in a direction extending transversely to a direction of elongation of each of said elongated channel and said elongated boss, to form an interference fit therebetween permitting constrained longitudinal motion of said elongated boss within said elongated channel and preventing lateral movement of said elongated boss within said elongated channel; and at least one payload carrier attachment adapted for carrying the payload, said at least one payload carrier attachment defining a mating mounting structure complementary to said mounting structure of said at least one payload support, said mating mounting structure being defined as another of said elongated channel and said elongated boss, said mating mounting structure being selectively mountable and demountable from each of said mounting structures in tool-free fashion by longitudinal sliding of said elongated boss relative to said elongated channel;

wherein said mounting assembly comprises a ratcheting rack-and-gear system, and wherein said pair of opposed jaws are interconnected by said system, said mounting assembly further comprising a drive handle attached to said system and operable to drive said gear to separate said pair of opposed jaws to cause them to engage and clamp against the rails of the saddle.

2. The carrier assembly of claim 1, wherein said pair of opposed jaws comprises an upper jaw and a lower jaw joinable by adjustable fasteners to form a clamp configured to clamp said at least one rail therebetween.

3. The carrier assembly of claim 1, wherein at least one of said pair of opposed jaws is joined to said at least one payload support by an elongated spreader spatially separating said at least one payload support from said mounting assembly.

4. The carrier assembly of claim 1, comprising at least two payload supports joined to said mounting assembly, each of said at least two payload supports having a respective first side and a respective second side extending transversely to said respective first side, each of said respective first sides and said respective second sides defining a respective mounting structure for supporting a payload carrier attachment for carrying a payload as carried by a payload carrier attachment.

5. The carrier assembly of claim 4, wherein said at least one payload carrier attachment comprises a carrier platform attachment, said carrier platform attachment having a substantially planar platform free from supportive sidewalls configured to support a payload, said carrier platform attachment further comprising a plurality of mating mounting structures complementary to said mounting structures of said at least one payload support, said plurality of mating mounting structures being positioned for concurrent mounting to at least two mounting structures of said at least two payload supports.

6. The carrier assembly of claim 1, wherein said at least one payload support is adjustably mounted to the mounting assembly to allow for adjustment of an angle of orientation of said at least one payload support relative to the mounting assembly and for securing of said at least one payload support in any selected one of a plurality of angular orientations.

7. The carrier assembly of claim 1, wherein said mounting assembly comprises an attachment mechanism for adjustably securing said at least one payload support in any selected one of a plurality of angular orientations relative to said mounting assembly.

8. The carrier assembly of claim 7, wherein said attachment mechanism comprises a hub threaded to receive a thumbscrew operable to clamp a mating hub of said at least one payload support therebetween to secure said at least one payload support in a selected angular orientation.

9. The carrier assembly of claim 8, wherein at least one of said hub and said mating hub comprises complementary structures collectively defining a plurality of detents for mating the hubs at a plurality of predefined angular orientations.

10. The carrier assembly of claim 8, wherein said boss is defined as a continuous rib.

11. The carrier assembly of claim 1, wherein each of said mounting structures comprises a plurality of tool-free mounting structure, each of said elongated channels and said elongated bosses being keystone-shaped in cross-section in a direction extending transversely to a direction of elongation of each of said elongated channels and said elongated bosses, to form an interference fit therebetween permitting constrained longitudinal motion of each said elongated boss within each said elongated channel and preventing lateral movement of each said elongated boss within each said elongated channel.

12. The carrier assembly of claim 1, wherein said mounting structures on said first side and said second side have a common orientation.

13. The carrier assembly of claim 1, wherein each of said mounting structures on each of said first side and said second side comprises a first tool-free mounting structure oriented in a vertical orientation and a second tool-free mounting structure oriented in a horizontal orientation.

14. The carrier assembly of claim 1, wherein said mounting structures of said at least one payload support define a first channel that is one of rearward-facing and side-facing and a second channel that is another of rearward-facing and side-facing.

15. The carrier assembly of claim 1, wherein each said mounting structure of said at least one payload support defines a first channel having a first orientation and a second channel having an orientation different from said first orientation on one surface of said at least one payload support that is one of rearward-facing and side-facing.

16. The carrier assembly of claim 1, wherein said at least one payload carrier attachment comprises an elongated tube having a sidewall, said sidewall defining an elongated channel extending part of a length of said tube, said tube being open at least one end.

17. The carrier assembly of claim 16, wherein said elongated tube further comprises a pair of bosses positioned on an external surface on opposite sides of said channel.

18. The carrier assembly of claim 16, said elongated tube having an upper end and a lower end, said lower end of said tube being shaped to form a point.

19. The carrier assembly of claim 1, wherein said at least one payload carrier attachment comprises a laterally-open bracket having a lower lip for supporting a fishing rod case in a vertical direction, and at least one strap for lashing a rod case to said bracket and supporting it in a horizontal direction.

20. The carrier assembly of claim 1, wherein said at least one payload carrier attachment comprises a bottle defining an internal volume closable by a cap.

21. The carrier assembly of claim 1, wherein said mounting assembly comprises a pair of interconnected opposed jaws adjustable to separate the jaws and spread them laterally between adjacent rails of the saddle to engage the rails and clamp the mounting assembly therebetween.

22. A carrier assembly mountable to rails of a saddle of a bicycle, the carrier assembly comprising:
a mounting assembly adapted for attachment to at least one rail of the saddle to secure said mounting assembly thereto;
at least two discrete payload supports joined to said mounting assembly, each of said at least two discrete payload supports defining a plurality of tool-free mounting structures located in positions in different planes relative to each other to enable mounting of a single payload carrier attachment in a plurality of orientations relative to a single orientation of said at least two discrete payload supports, each of said mounting structures being defined as one of an elongated channel having a closed end and an elongated boss dimensioned to be received in said channel, each of said elongated channel and said elongated boss being keyed in cross-section in a direction extending transversely to a direction of elongation of each of said elongated channel and said elongated boss, to form an interference fit therebetween permitting constrained longitudinal motion of said elongated boss within said elongated channel and preventing lateral movement of said elongated boss within said elongated channel; and
at least one payload carrier attachment adapted for carrying the payload, said at least one payload carrier attachment defining a mating mounting boss complementary to said channel of said at least two discrete payload supports, said boss being selectively mountable and demountable from said channel in tool-free fashion by longitudinal sliding of said elongated boss relative to said elongated channel;
wherein said mounting assembly comprises a ratcheting rack-and-gear system, and wherein said pair of opposed jaws are interconnected by said system, said mounting assembly further comprising a drive handle attached to said system and operable to drive said gear to separate said pair of opposed jaws to cause them to engage and clamp against the rails of the saddle.

23. The carrier assembly of claim 22, wherein said mating mounting boss and said channel are one of keystone-shaped and T-shaped in cross-section.

24. The carrier assembly of claim 22, wherein at least one of said-mounting structures further defines a locking mechanism comprising a catch pivotably mounted for movement between an inoperative position in which a tip of said catch is positioned outside of said channel and an operative position, in which said tip of said catch is positioned within said channel, said mating mounting boss defining a socket dimensioned and positioned for receiving said tip of said catch when said boss is seated within said channel.

25. The carrier assembly of claim 24, wherein said locking mechanism further comprises a resilient member biasing said catch toward said operative position.

26. The carrier assembly of claim 25, wherein said locking mechanism further comprises a resilient tab biasing said catch toward said operative position.

27. The carrier assembly of claim 22, wherein at least one of said at least two payload supports defines a first channel that is one of rearward-facing and side-facing and a second channel that is another of rearward-facing and side-facing.

28. The carrier assembly of claim 22, wherein at least one of said at least two payload supports defines a first channel having a first orientation and a second channel having an orientation transverse to said first orientation on one surface of said at least one payload support that is one of rearward-facing and side-facing.

29. A carrier assembly mountable to rails of a saddle of a bicycle, the carrier assembly comprising:
a mounting assembly comprising:
a drive handle rotatable about an axis; and
a ratcheting rack-and-gear system comprising:
a gear mechanically interconnected with said drive handle such that rotation of said drive handle about the axis drives said gear to rotate; and
a pair of racks positioned on opposite sides of said gear and mechanically interconnected therewith to be driven to move in opposite directions when driven by rotation of said gear; and
a pair of opposed jaws each defining a socket dimensioned to receive a respective one of a pair of spaced rails of the saddle to secure said mounting assembly thereto, each of said pair of opposed jaws being joined to a respective one of said pair of racks, each of said pair of opposed jaws extending outwardly from a plane of said gear and said pair of racks in a direction of the axis;
at least one payload support joined to said mounting assembly, said at least one payload support defining a mounting structure; and
at least one payload carrier attachment, said at least one payload carrier attachment defining a mating mounting structure complementary to said mounting structure of said at least one payload support, said mating mounting structure being selectively mountable and demountable from said mounting structure in tool-free fashion.

30. The carrier assembly of claim 29, wherein said mounting assembly comprises an attachment mechanism for adjustably securing said at least one payload support in any selected one of a plurality of angular orientations relative to said mounting assembly.

31. The carrier assembly of claim 30, wherein one of said mounting structure and said mating mounting structure comprises a channel and another of said mounting structure and said mating mounting structure comprises a boss dimensioned to fit within said channel.

32. The carrier assembly of claim 31, wherein said at least one payload support comprises a plurality of mounting structures.

33. The carrier assembly of claim 32, wherein at least one of said plurality of mounting structures is oriented in a vertical orientation and at least one of said plurality of mounting structures is oriented in a horizontal orientation.

34. The carrier assembly of claim 33, wherein said at least one payload support defines a first channel that is one of rearward-facing and side-facing and a second channel that is another of rearward-facing and side-facing.

35. The carrier assembly of claim 33, wherein said at least one payload support defines a first channel having a first orientation and a second channel having an orientation different from said first orientation on one surface of said at least one payload support that is one of rearward-facing and side-facing.

36. The carrier assembly of claim 32, wherein said at least one payload carrier attachment comprises an elongated tube having a sidewall, said sidewall defining an elongated channel extending part of a length of said tube, said tube being open at least one end.

37. A carrier assembly mountable to rails of a saddle of a bicycle, the carrier assembly comprising:
a mounting assembly adapted for attachment to at least one rail of the saddle to secure said mounting assembly thereto, wherein said mounting assembly comprises a pair of interconnected opposed jaws adjustable to separate the jaws by translating them to spread them laterally between adjacent rails of the saddle, said translation of said jaws causing said jaws to engage the rails and clamp the mounting assembly therebetween;
at least one payload support joined to said mounting assembly, said at least one payload support defining a mounting structure for supporting a payload carrier attachment for carrying a payload as carried by a payload carrier attachment, said mounting structure being defined as one of an elongated channel having a closed end and an elongated boss dimensioned to be received in said channel, each of said elongated channel and said elongated boss being shaped in cross-section, in a direction extending transversely to a direction of elongation of each of said elongated channel and said elongated boss, to form an interference fit therebetween permitting constrained longitudinal motion of said elongated boss within said elongated channel and preventing lateral movement of said elongated boss within said elongated channel; and
at least one payload carrier attachment adapted for carrying the payload, said at least one payload carrier attachment defining a mating mounting structure complementary to said mounting structure of said at least one payload support, said mating mounting structure being defined as another of said elongated channel and said elongated boss, said mating mounting structure being selectively mountable and demountable from said mounting structures in tool-free fashion by longitudinal sliding of said elongated boss relative to said elongated channel.

38. A carrier assembly mountable to rails of a saddle of a bicycle, the carrier assembly comprising:
   a mounting assembly adapted for attachment to at least one rail of the saddle to secure said mounting assembly thereto;
   at least two payload supports joined to said mounting assembly, each of said at least two payload supports having a first side and a second side extending transversely to said first side, each of said respective first sides and said respective second sides defining a respective mounting structure for supporting a payload carrier attachment for carrying a payload as carried by a payload carrier attachment, each said mounting structure being defined as one of an elongated channel having a closed end and an elongated boss dimensioned to be received in said channel, each of said elongated channel and said elongated boss being shaped in cross-section, in a direction extending transversely to a direction of elongation of each of said elongated channel and said elongated boss, to form an interference fit therebetween permitting constrained longitudinal motion of said elongated boss within said elongated channel and preventing lateral movement of said elongated boss within said elongated channel; and
   at least one payload carrier attachment adapted for carrying the payload, said at least one payload carrier attachment defining a mating mounting structure complementary to said mounting structure of said at least one payload support, said mating mounting structure being defined as another of said elongated channel and said elongated boss, said mating mounting structure being selectively mountable and demountable from each of said mounting structures in tool-free fashion by longitudinal sliding of said elongated boss relative to said elongated channel.

39. The carrier assembly of claim 38, wherein said at least one payload carrier attachment comprises a plurality of mating mounting structures complementary to said mounting structures of said at least two payload supports, said plurality of mating mounting structures being positioned for concurrent mounting to at least two mounting structures of said at least two payload supports.

* * * * *